(12) United States Patent
Lotzer

(10) Patent No.: US 10,242,241 B1
(45) Date of Patent: Mar. 26, 2019

(54) ADVANCED MOBILE COMMUNICATION DEVICE GAMEPLAY SYSTEM

(75) Inventor: Carey Leigh Lotzer, Sachse, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 500 days.

(21) Appl. No.: 13/292,272

(22) Filed: Nov. 9, 2011

Related U.S. Application Data

(60) Provisional application No. 61/411,650, filed on Nov. 9, 2010.

(51) Int. Cl.
*G06K 9/00* (2006.01)
*A63F 13/00* (2014.01)

(52) U.S. Cl.
CPC .............. *G06K 9/00* (2013.01); *A63F 13/00* (2013.01)

(58) Field of Classification Search
CPC .............. A63F 13/00; G06T 13/40; G06T 2207/20044; G06F 3/04815; G06F 3/04883; G06F 3/00; G06F 3/017; G06K 9/00335; G09G 5/00
USPC .............................................................. 463/8
See application file for complete search history.

(56) References Cited

U.S. PATENT DOCUMENTS

| 9,069,385 | B1* | 6/2015 | Lynch | G06F 3/017 |
| 2011/0013807 | A1* | 1/2011 | Lee et al. | 382/107 |
| 2011/0107216 | A1* | 5/2011 | Bi | 715/716 |
| 2011/0154266 | A1* | 6/2011 | Friend et al. | 715/863 |
| 2011/0302293 | A1* | 12/2011 | Buban | G06F 3/011 709/224 |
| 2012/0079080 | A1* | 3/2012 | Pishevar | 709/220 |
| 2012/0100900 | A1* | 4/2012 | Su et al. | 463/8 |

OTHER PUBLICATIONS

"An HMM-Based Threshold Model Approach for Gesture Recognition" by Hyeon-Kyu Lee and Jin H. Kim, IEEE Transactions on Pattern Analysis and Machine Intelligence, vol. 21, No. 10 (Oct. 1999).*

* cited by examiner

Primary Examiner — James S McClellan
Assistant Examiner — Syvila Weatherford

(57) ABSTRACT

A mobile communications device including a transceiver, a motion input or other optical device, and a system for supporting single or multi-player gameplay is described. A method of playing a game is provided including transmitting and receiving information between one or more devices through a mobile communications system with use of one or more tethered and/or wireless links; and playing a game on the mobile communications device. Further one or more players either creating or receiving one or more motions, thereby communicating through the device, receiving and/or transmitting some or all of the game data and may also receive/transmit one or more motion results and having the ability to send and/or receive one or more motion instructions to/from another one or more devices.

18 Claims, 15 Drawing Sheets

ADVANCED MOBILE COMMUNICATION DEVICE GAMEPLAY SYSTEM

CROSS-REFERENCE TO RELATED APPLICATION

The instant application claims priority to provisional application No. 61/411,650, filed Nov. 9, 2010, entitled ADVANCED MOBILE COMMUNICATION DEVICE GAMEPLAN SYSTEM, the entire contents of which are incorporated by reference herein.

BACKGROUND OF THE INVENTION

Field of the Invention

The instant invention relates to a mobile communications device receiving and/or transmitting one or more motions in order to play a game on the mobile device and may include the ability to interact with other mobile devices as well as potentially effecting the gameplay capabilities and interactions of multiple mobile devices. And additionally may have the ability to store and/or retrieve motion data and other game information from none or more servers, consoles, personal computers, storage devices and/or other mobile communication devices.

BRIEF DESCRIPTION

A mobile game is a video game played on a mobile phone, smartphone, PDA, handheld computer or portable media player. Tens of millions of users worldwide play games, as well as make phone calls, on their cell phones and other handheld devices. Gameplay modes include options setup and the actual gameplay. In order to set and/or change the game preferences and/or to play a game, a physical or mechanical switch is used to direct the motion of the player's character avatar on the screen and within a game.

One of the first publicly available games that were pre-installed onto a mobile phone was Snake on selected Nokia models in 1997. Snake and its variants have since become one of the most-played video games on the planet, with over a billion people having played the game.

The communication between these devices and across the network can be performed using a tethered cable or over a wireless communication protocol, such as Bluetooth, over GPS using satellite protocols, a wireless local network, or a wireless telephone network.

For networked games, there are various technologies in common use. Examples include text messaging via short message service (SMS), multimedia messaging service (MMS), general packet radio services (GPRS), or global positioning system (GPS), enabling location identification. However, there are non-networked applications, which simply use the device platform to run the game software. The games may be installed over the air, they may be side loaded onto the handset with a cable, or they may be embedded on the handheld devices by the OEM or by the mobile operator.

Mobile games are usually downloaded via the mobile operator's radio network, but in some cases are also loaded into the mobile handsets when purchased, via infrared connection, Bluetooth, or memory card.

Mobile games tend to be small in scope and often rely on good gameplay over flashy graphics, due to the lack of processing power of the client devices.

A multiplayer mobile game is often a re-branding of a multiplayer game for the PC (personal computer) or Console. Most mobile games are single player mobile games perhaps with artificially intelligent opponents. Multiplayer functionality is achieved through infra-red, Bluetooth, GPRS, 3G ($3^{rd}$ generation technologies), Wi-Fi, AI (artificial Intelligence), MMS, and wireless LAN (local area network).

With respect to other mobile gaming and communication devices, there are several choices, with the ability to both communicate with each other as well as play games. There exist products from several cellular phone manufacturers as well as game companies. The units are usually small but can also be considerable in size to where playing games can be just as entertaining as with a console unit or a computer.

The communication between these devices can be tethered or untethered and/or across a network or can be performed over a wired connection, using a wireless network protocol, such as Bluetooth, over infra-red, over GPS using satellite protocols, a wireless local network, or a wireless telephone network.

Mobile games are played using the technologies present on the device itself

While many mobile gaming systems, mobile communication devices and protocols exist, having varying screen sizes, game system capabilities, embedded software, etc. they all have one thing in common—they all require the player to touch a screen, press keys, or come into contact with some other portion of the device or an apparatus connected to the device in order to play a game, interact with the game, or interact with the mobile communication device in some manner. Regardless of the device or the game, the game being played requires contact from the player using their fingers or other instrument to communicate with the game software.

The movement of the avatar or other one or more objects, for example, require the movement and pressing or tapping force of one or more fingers, hands or other objects as the game progresses by pressing or touching the mechanical switches which are further designed to offer resistance to the force applied so that the buttons, for example, respond, contract and then recover to their original position for the next press. The same is true when a setting or option is being changed or a same is being saved or loaded, etc.

In the case of handheld mobile communication devices, a key pad may exist on the surface of the unit to control the game. Other units with touch screens may allow the fingers or a stylus to control gameplay, while still others may use the cellular phone key pad. In the case of the touch screen, the player's finger must come in contact with the surface of the screen material. Once a contact has been made, electrical pulses are interpreted as movement which must be further processed to determine sense of direction, etc.

In accordance with the present invention, all of the methods which exist to control the gameplay, whether through a key pad, characters on a keyboard, touch screen presses, etc. may be referred to as the control pad. The control pad is used to control a player's character (avatar), group of characters or other objects in a game. The controller is used to send signals, such as commands, to the game software.

Example commands include object movement and actions such as shooting, strumming, jumping, swimming, punching, kicking, skiing, balancing, running, etc. In addition to these, commands are sent to the console using the controller to make game selections, retrieve statistics, save games, load games, choose clothing, choose body and facial settings, configurations and options, etc. In some cases, controller pads can be used to receive feedback from the mobile communication device based on gameplay which may include vibration, haptic signals, and/or audio signals as a means to enhance the player's experience and awareness of particular situations.

The game unit is a device used to read and execute the game software as well as read the commands from the control pad, display the game on a screen and otherwise interact with the player.

In cases of warning a player, for example, an audio and/or vibrating signal can be sent to the control pad when their character is being hit. The software, in this case, may also use some visual on-screen indicator to further warn the player. In this instance, the player could use the controller to turn the character in the direction of the opponent, and apply a particular action to ward off the opponent. This requires movement of the fingers and eyes to move the character in the direction of the opponent, for example, to fend them off.

The current invention is designed to eliminate this required control of the game by replacing it with a motion, optical, audio or other reader which has the ability to read finger motions, eye motions, lip motions, audio commands, etc., as well as read voice patterns which can act as sophisticated as a controller pad but also provide the player with more freedom and flexibility.

SUMMARY OF THE INVENTION

In accordance with the instant invention, a particular embodiment exists having a mobile communications device including a transceiver and a motion device wherein the mobile communication device supports single or multi-player game play. An example of exiting mobile communication devices include, but not limited to, a cellular phone, a tablet, a table PC, a laptop, a personal data assistant (PDA), a Nintendo DS or DSi, a Sony Personal Playstation, as well as many other devices from many different manufacturers.

A method of playing a game is provided including transmitting and/or receiving information between one or more devices through a mobile communication device with use of a tethered or wireless link; and playing a game on the mobile communications device. Further the communications device receiving and/or transmitting all or some of the game data and may also receive/transmit motion instructions, motion results and/or other game information.

There is a desire to provide a player with the ability to interact with one or more devices using motion, facial expressions (including lips and eyes, for example) and/or verbal commands without the use of or to augment the use of the hands or fingers. Currently, this is not available in the marketplace.

The present invention employs a method of receiving one or more hand or other body motions, voice commands or facial changes (i.e., eyes, lips, etc.) and interpreting the information received as data packets and then processing the data packets into meaningful control mechanisms which can be provided to the game software in order to establish a gameplay motion, a setting change, a communication of some sort, etc. and any other activity which is available to the game player using a controller. In this manner, the game player may experience more freedom during gameplay and have the ability to interface with the mobile communication device more naturally and unencumbered.

The game software is a software program which runs either fully or partially on the mobile communication device and forms the environment the player is immersed in during gameplay. It also can be used to store and/or receive information from the motion device, a memory, a storage, a network or other devices, where such memory and/or storage can be a part of the mobile communication device, separate, or connected to the instant invention through a wire or connected remotely. The game software may also send data to the display unit to display game objects to the player through the console and/or to the display device, send audio signals to the audio device, and/or interface with the player through the mobile communication device.

As current gameplay systems utilizing a mobile communication device do not have the ability to receive motion inputs from the one or more players playing a game. The instant invention introduces the ability to interact with the mobile communication device and software through the use of one or more devices (i.e., cameras, motion sensors, optical detectors, microphones, etc.) one or more of which are utilized by the instant invention and software processes (i.e., the ability to discern motion and direction, pressure, impact of force, velocity, voice commands, facial changes, eye movements, etc.).

The devices may be produced and/or available which mount to or on top of existing mobile communication devices or come integrated with the mobile communication devices or are communicatively coupled to the mobile communication device through some means. The devices may send signals, which may include interrupt logic, to the program software to support the motion detecting capabilities of the instant invention as well as new devices developed to do the same.

Another advantage to the present invention is the ability to reduce or eliminate the pain and other potential damage brought onto the game player exposed to a prolonged and/or significant use of a mouse, key pad, controller, game pad or joy stick because the interaction with the mobile communication device using the instant invention is completely hands-free.

For complete hands-free activity, the game unit can be set on a floor, table, or other surface with the optical receiver, or other devices, facing the player and may be propped up with a kickstand or other means, but may also allow for the ability to interact with the mobile communication device, for example, with just one hand to receive motion from the other hand and/or detect facial changes and/or receive voice commands, etc. In this manner, the instant invention may give the player the ability to play anywhere they wish.

Eye, hand and/or body motion tracking devices could be used as well as devices which process audio commands and/or logic devices capable of negotiating command gestures based on signals and projected angles of response. In the case of a multidimensional tracking environment, these projected command gestures and controls could be responded to over a network of optical and motion tracking devices programmed to respond in a unified manner.

Beyond the use of audio commands, an embodiment of the current invention has the ability to detect and interpret specific body, eye, facial and/or hand motions in order to interact with the mobile communication device either by issuing one or more commands, making system changes, or retrieving one or more items out of the mobile communication device's storage unit that the avatar or other one or more objects within the game may use or perform associated actions.

Because of the advancements of the current invention, there are several meaningful directions which are taken. Taking the concept further, an embodiment of the current invention involves a series of single and multiple (present or not) player combinations, several advancements in optical and computer-aided technologies for the purpose of making gameplay more realistic without the use of a controller, as well as a series of devices used for character interaction, control, feedback and/or for the purpose of enhancing the perception of the one or more subjects during the gameplay experience while maintaining a low-level of cost and complexity for the user or manufacturer.

In the context of the instant invention, a motion instruction is the series of one or more motions that the game software can utilize to effect the game play or other interaction with a game software, such as a setting change, a game save, etc. For example, if a motion is made by a player putting their hand up to stop traffic, the mobile communication device could interpret this as a command to pause the game. In this way, the mobile communication device may halt gameplay and show the options menu to the player which could allow the player to perform one or more tasks or have the ability to resume the game. The information the game software uses to interpret the motion made by the player, a motion command, is called the motion instruction. The same is true for voice commands where the data used to tie the voice command to the game software is called the voice instruction.

The instant invention possesses several innovative characteristics which open the game environment to game developers and players alike. Where a communication between a first mobile communication device and another device may be made, the connection can be made using a cable, infrared, or a wireless connection using a communication protocol of choice. The innovative characteristics are noted as follows:

Transfer Progress—the ability to save, transfer and retrieve game progress to/from a first mobile communication device, and/or a console, and/or a second mobile communication device and/or a server and/or a personal computer and/or another machine or storage device. For example, if a player is playing a game on a first console, and they wish to take the game to a mobile communication device to play on the road, they may instruct the two devices to communicate, using a motion command, where the first device carries the game update and transmits the game update from the first device to a second device, the second device receiving the game update and storing the game update which can be used by the software to resume the player's progress in the game on the second device, such as a mobile communication device.

Transfer Motion—the ability to save, transfer and retrieve one or more motion instructions to/from a first mobile communication device, and/or a console, and/or a second mobile communication device and/or a server and/or a personal computer and/or another machine or other storage device. For example, if a player is playing a game on a first console, using one or more motion instructions, and they wish to take the game to a mobile communication device to play on the road with the same one or more motion instructions, they may instruct the two devices to communicate, using a motion command or other command, where the first device carrying the original one or more motion instructions used on the first device and transmits the one or more motion instructions from the first device to a second device, the second device receiving the one or more motion instructions and storing the one or more motion instructions which can be used by the software to resume the player's capabilities in the game on the second device, such as a mobile communication device without having to re-input the original one or more motion instructions into the second device in a manual manner or through a motion learning process.

Motion Communication—the ability to effect and/or be effected by motion results in a multi-player environment in communication to/from a first mobile communication device, and/or a console, and/or a second mobile communication device and/or a server and/or a personal computer and/or other machine or other storage device. For example, a player could direct motion instructions from their mobile communication device to the receiving console, and/or a second mobile communication device and/or a server and/or a personal computer where the receiving player sees the avatar of the first player on their screen acting out the motion instruction. In contrast to this, it may also be possible for the first player to transmit a motion instruction to the second player's avatar so that the second player can see the resulting motion instruction applied to their own avatar.

In further detail regarding the motion communication, as a brief example of the processing which may take place, the motion instruction initiated from a player using a first mobile communication device may be directed at a second avatar on a second mobile communication device by first producing a motion on the first mobile communication device, the motion being interpreted as a command by the first mobile communication device; the motion communication further interpreted as a command which is directed at the second avatar on the second mobile communication device; the motion communication packaged into a motion instruction by the first mobile communication device and the resulting motion instruction delivered from the first mobile communication device to the second mobile communication device, received by the second mobile communication device and unpackaged into a motion communication understood by the second mobile communication device to be directed at the second avatar. The motion communication applied to the second avatar by the second mobile communication device; the second avatar presented on the screen acting out the motion command instructed to perform by the receipt of the motion command to the second mobile communication device.

For example, the motion instruction sent from the first mobile communication device may be to help carry the wounded first avatar to safety, or drop a gun for the first avatar, or go on ahead as point, or give the first avatar a health pack, or any number of potential motion commands directed at another one or many avatars.

As described previously, the instant invention has the ability to receive and/or transmit motion instructions to/from a console system or other mobile system so that the motion instructions do not need to be re-input into the receiving gaming system. The motions made by the player and interpreted into motion instructions by the game software on the console system may not be the same motions the player would be making if they were playing the same game on a mobile communication device. For example, dribbling a ball on a console system, using the entire body may not be plausible or desirable on a mobile communication device. A new motion may be performed on the mobile communication device, such as moving the hand in an up-and-down motion, based on the context of the game, being interpreted as the same dribbling motion by the mobile game device. In this manner, the game may still be played by having a naturally navigable motion equivalent stored on either or both the console and mobile communication device so that the two different motions may be interpreted by the console device and/or the mobile communication device as the intended motion of dribbling a ball.

The ability to do this is based on the method of which the motion instructions are mapped in the game system where the first motion instruction is tied to the second motion instruction by an index value. The first motion instruction being used for full-body or console gameplay, for example, the second motion instruction being used for close proximity gameplay such as that for a mobile communication device.

With this innovation of the instant invention, the same game may be played practically in many different environments so that the player is not constrained to a single motion instruction for either of the intended gameplay target devices. An example embodiment of the present invention may include a method of processing user movement via a mobile computing device. The method may include receiving at least one user movement via the mobile computing device, measuring an arc of change based on a change between a first user position and a second user position of the at least one user movement, interpreting the arch of change as at least one motion instruction, creating packet data representing the at least one motion instruction; and transmitting the packet data to a separate communication device. Another example embodiment of the present invention may also include an apparatus configured to process user movement. The apparatus may include a receiver configured to receive at least one user movement, a processor configured to measure an arc of change based on a change between a first user position and a second user position of the at least one user movement, interpret the arch of change as at least one motion instruction, and create packet data representing the at least one motion instruction. The apparatus may also include a transmitter configured to transmit the packet data to a separate communication device.

BRIEF DESCRIPTION OF THE DRAWINGS

The foregoing aspects and other features of the present invention are explained in the following description, taken in connection with the accompanying drawings, wherein.

DETAILED DESCRIPTION OF THE INVENTION

Figure 1:
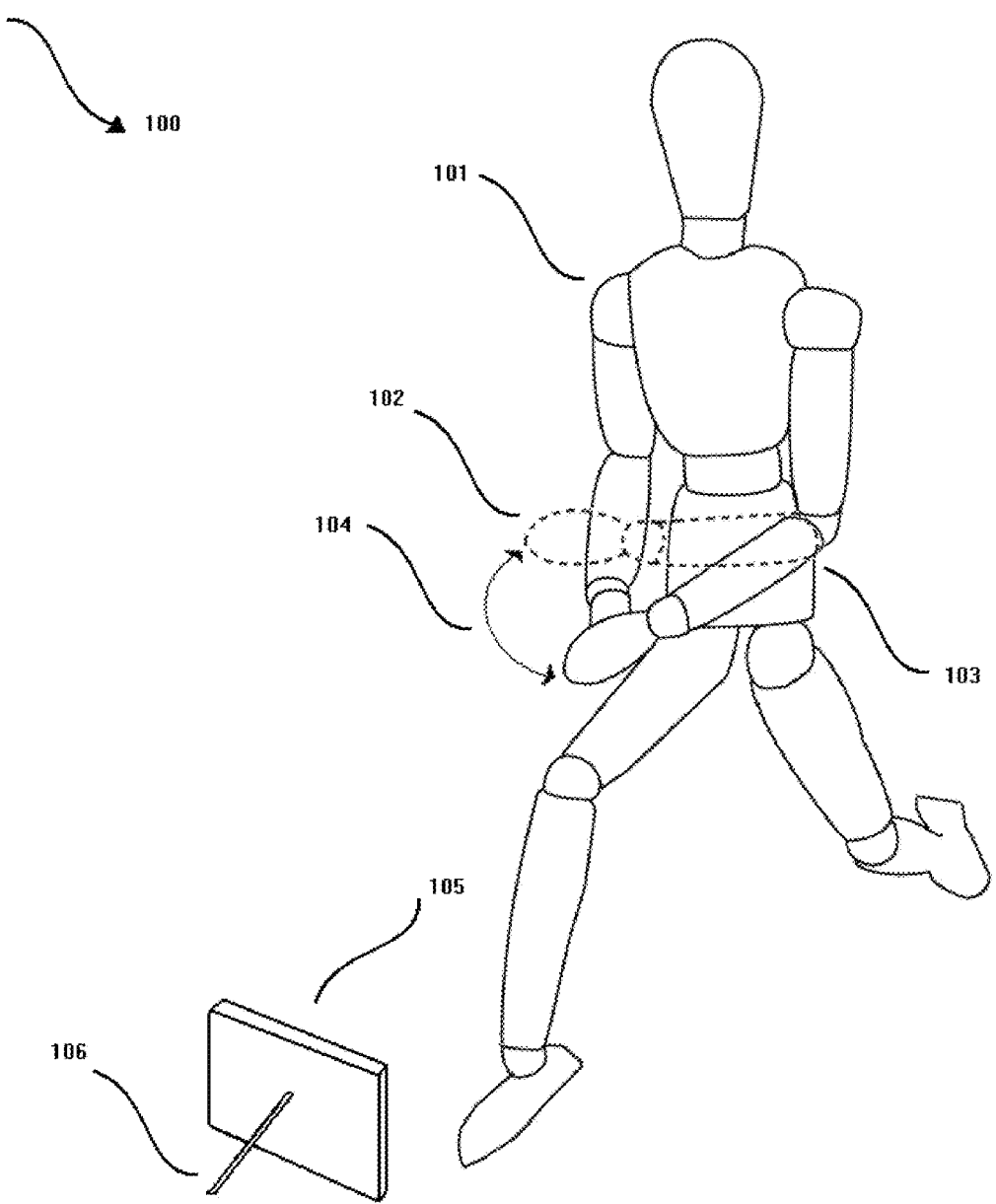
FIG. 1 is an example of a player producing a motion using a mobile communication device hands-free.

Referring to FIG. 1, a player 101 (described in system 100, shown in more detail in a system 800) in front of a mobile communication device 105, which may be supported by a stand 106 or other object. While in front of the mobile communication device 105, the player 101 may change a facial feature or move a body part such as an arm 103 from the first position of the arm 103 to the second position of the arm 102. The arc of change 104 is measured from the original first position of the arm 103 to the second position of the arm 102. The arc 104, detected by the mobile communication device 105, can be interpreted as a motion instruction.

Figure 2:
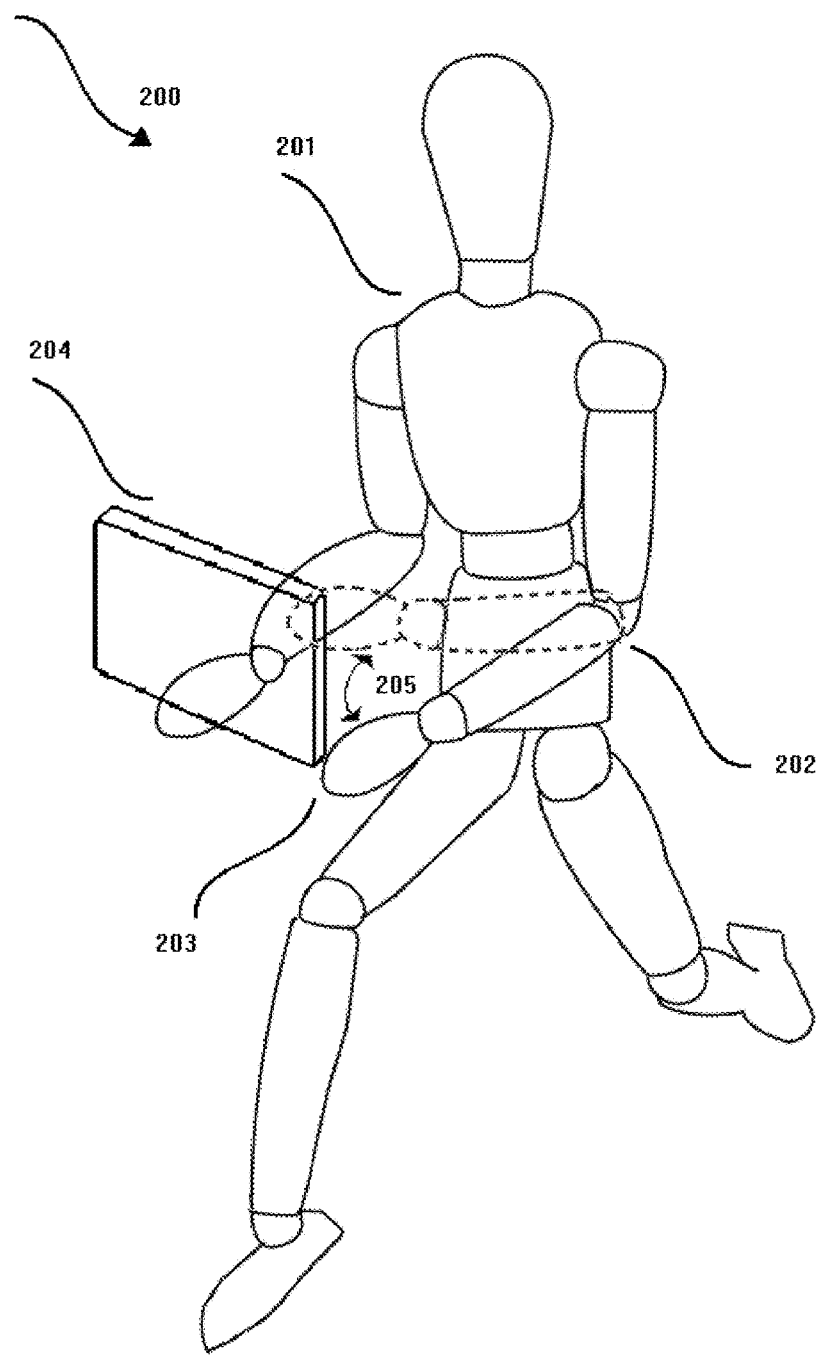
FIG. 2 is an example of a player producing a motion using a mobile communication device held in their hand.

Now referring to FIG. 2, a player 201 (described in a system 200, shown in more detail in a system 800) is holding a mobile communication device 204. While in front of the mobile communication device 204, the player 201 may change a facial feature, issue a voice command or move a body part such as an arm 203 from the first position of the arm 203 to the second position of the arm 202. The arc of change 205 is measured from the original first position of the arm 203 to the second position of the arm 202. The arc 205, detected by the mobile communication device 204, can be interpreted as a motion instruction.

Figure 3:
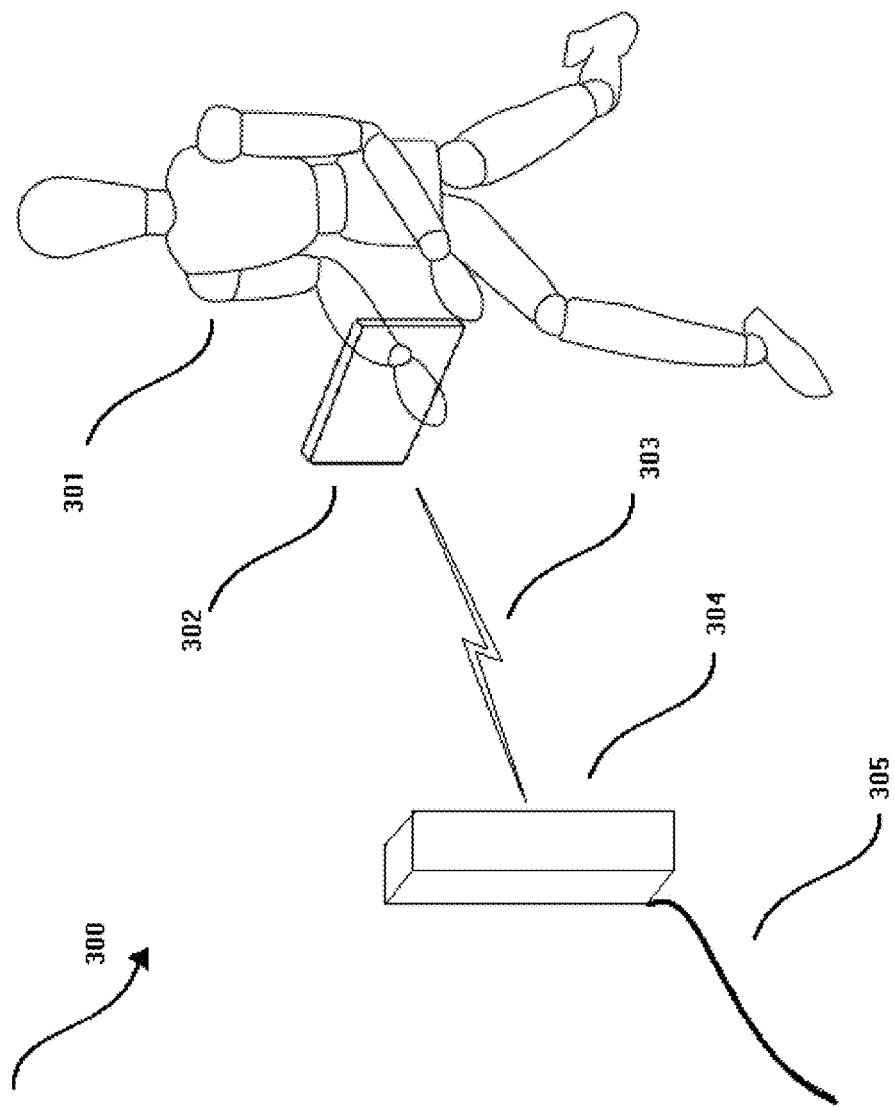
FIG. 3 is an example of a player downloading or uploading game information to/from a console game unit from/to a mobile communication unit.

Now referring to FIG. 3, a player 301 (described in a system 300, shown in more detail in a system 800) is holding a mobile communication device 302. While in front of the mobile communication device 302, the player 301 may change a facial feature, issue a voice command or move a body part (described in a system 300 of the instant invention, not fully shown) communicatively coupled to a device 304, further communicating with a device (i.e., console unit, personal computer, game unit, storage device, server, etc.) 304 via a tethered or wireless communication protocol 303. The device 304 connected to none or more devices such as a server (not fully shown) through a tethered or wireless communication line 305.

The connected state where the mobile communication device 302 is communicatively coupled to a device 304, may transmit game information to the device 304 via a communication protocol 303 further being stored to the device 304.

In addition, the connected state where the mobile communication device 302 is communicatively coupled to a device 304, may receive game information from the device 304 via a communication protocol 303 further being stored to the mobile communication device 302.

Finally, the connected state where the mobile communication device 302 is communicatively coupled to a device 304, may both transmit and receive game information to/from the device 304 via a communication protocol 303 further being delivered and stored either to/from the mobile communication device 302 or to/from the mobile communication device 302 or both.

Figure 4:
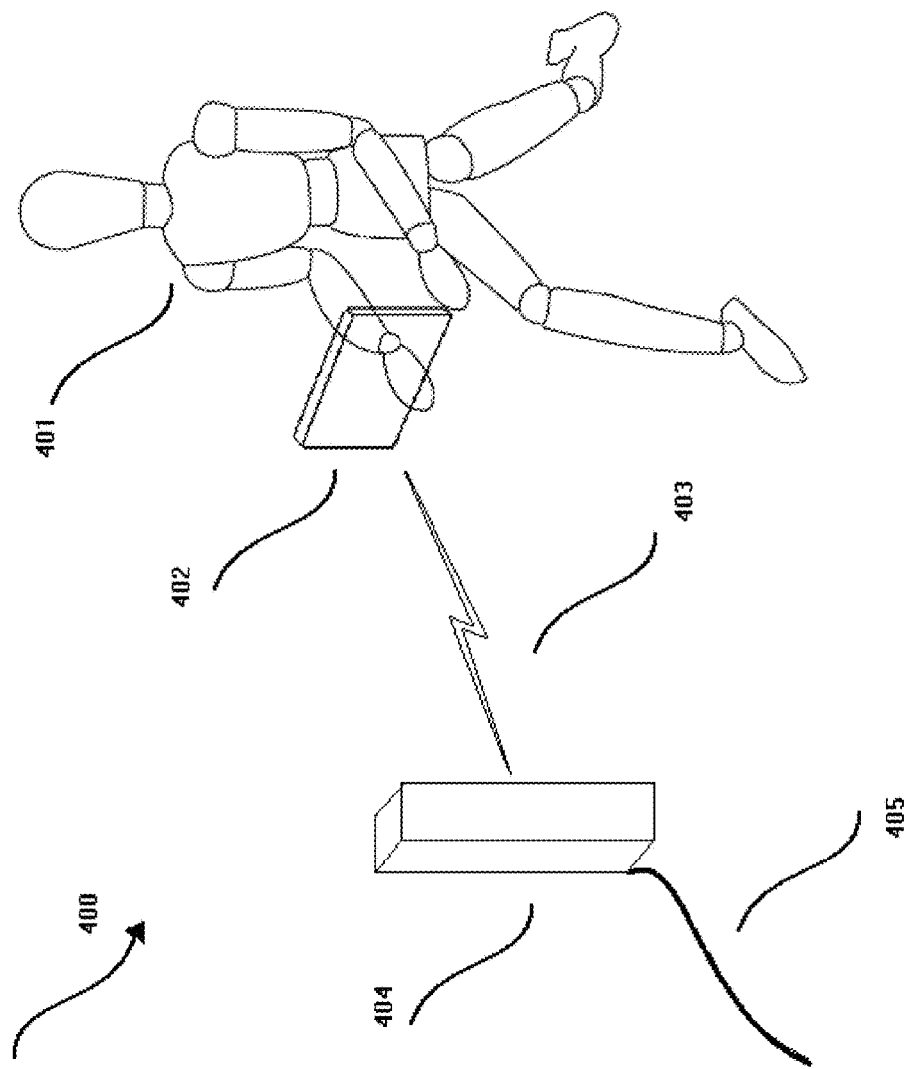
FIG. 4 is an example of a player downloading or uploading one or more motion instructions to/from a console game unit from/to a mobile communication unit.

Now referring to FIG. 4, a player 401 (described in a system 400, shown in more detail in a system 800) is holding a mobile communication device 402. While in front of the mobile communication device 402, the player 401 may change a facial feature, issue a voice command or move a body part (described in a system 400 of the instant invention, not fully shown) communicatively coupled to a device 404, further communicating with a device (i.e., console unit, personal computer, game unit, storage device, server, etc.) 404 via a tethered or wireless communication protocol 403. The device 404 connected to none or more devices such as a server (not fully shown) through a tethered or wireless communication line 405.

The connected state where the mobile communication device 402 is communicatively coupled to a device 404, may transmit one or more motion instructions to the device 404 via a communication protocol 403 further being stored to the device 404.

In addition, the connected state where the mobile communication device 402 is communicatively coupled to a device 404, may receive one or more motion instructions from the device 404 via a communication protocol 403 further being stored to the mobile communication device 402.

Finally, the connected state where the mobile communication device 402 is communicatively coupled to a device 404, may both transmit and receive one or more motion instructions to/from the device 404 via a communication protocol 403 further being delivered and stored either to/from the mobile communication device 402 or to/from the mobile communication device 402 or both.

Figure 5:
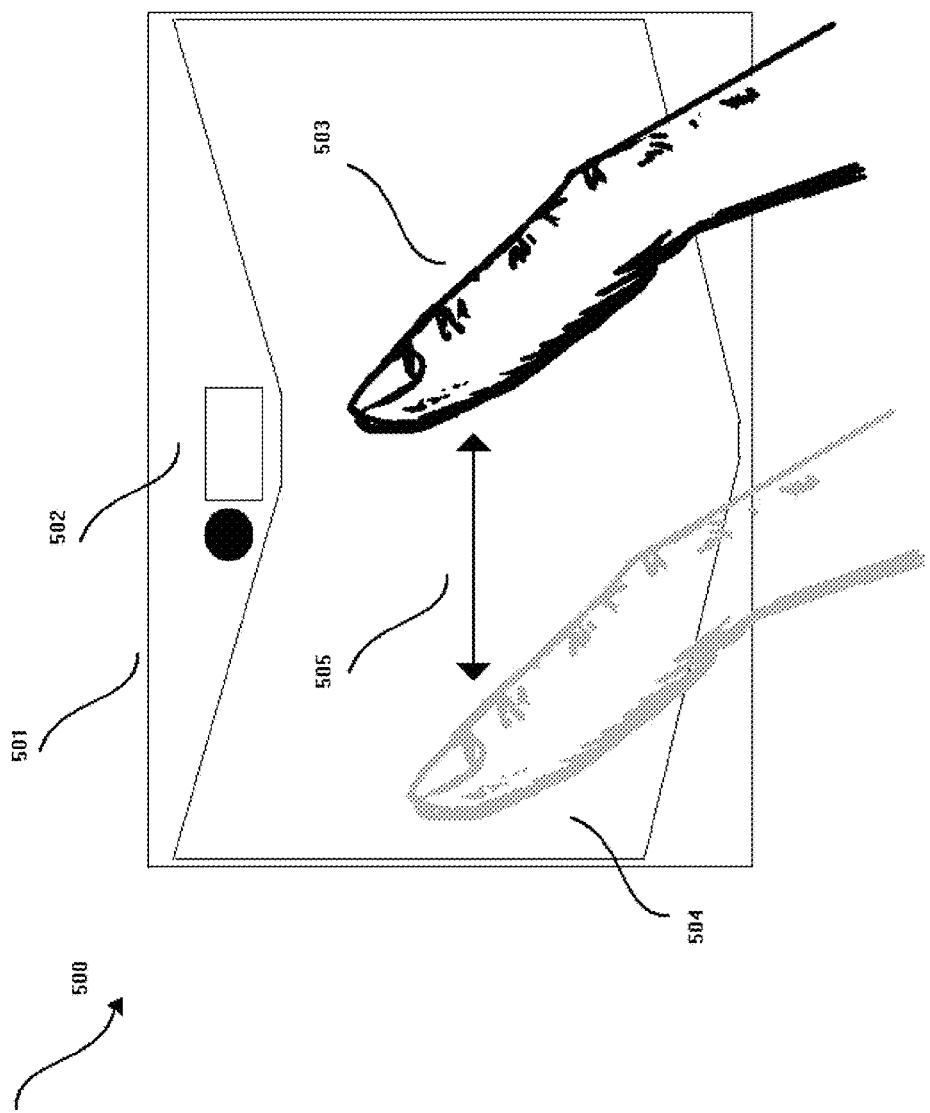
FIG. 5 is an example of a player using a mobile communication device to play a game with finger motions.

Now referring to FIG. 5, a player using their voice, finger or other body part 503 (described in a system 500, shown in more detail in a system 800) using a mobile communication device 501, exposed to an optical device, microphone and/or other device or combination of devices, either built-in to the communication device or simply attached to it, 502 which may be found any where on or embedded in the mobile communication device 501, may apply one or more motions 505 to the communication device 501, through a change in the position of the first object, in this case the player's finger 503, relative to a second position 504 or the player's finger 503 without touching the communication device 501, thereby generating one or more motion instructions (not fully shown).

For example, if the player wanted their avatar to attack another avatar using a kick-jump-triple-spin move, the player may move their finger in a spiral and then straight up and then down to initiate the move, where in a traditional system, the player would be required to successfully press a series of one or more buttons to produce the same move. The game software may interpret the one or more motion instructions or button commands in the same manner but the one or more motion instructions, having the possibility to be completely customizable by the player, could give the player additional ranges of freedom and flexibility.

For example, if the kick-jump-triple-spin move, using the conventional method or pressing one or more buttons on the player's controller, could require the player to swirl the left-stick and press the red and blue buttons on their controller one after the other to produce the sequence of signals from the player to the controller to the game software so that the game software interprets this as a common to produce the move.

Regarding the method used with the instant invention, the player could simply swirl their finger three times and then point up. The motion could be received by the mobile communication device, converted to one or more motion instructions and then the avatar could move accordingly without the need for the player to press any buttons. In this manner, the same move made by the avatar would be performed by the player only moving their finger in the air and not touching the controller.

In addition, the mobile communication device could have a gyroscope contained within it or other device, for example, which could be used to measure the one or more bodily motions of the player. For example, lunging right, left, up, down, forwards, backwards, shaking the device, etc. could produce one or more motion instructions directed at one or more avatars either locally on the mobile communication device or connected remotely.

For instance, lunging back while the player's avatar is in the cockpit of a fighter jet, could be interpreted by the game software and/or mobile communication device that the avatar, as a pilot, is being propelled in the air using the jet's afterburners with an increased g-force so that the mobile communication device would interpret this motion in a different manner than the usual flight speed of the jet.

Likewise, in a race car, the player could lunge back and the mobile communication device could interpret the motion command as the avatar being pressed into the driver's seat as the turbo boost on the race car engages. The mobile communication device could vibrate as the car speeds on.

In order to process this lunging motion, for example, the instant invention would receive motions from the player through the gyroscope or other device in the mobile communication device, which would send signals to the game software. These signals would then be compared to signals stored on the mobile communication device related to known results which are used by the mobile communication device and/or game software to effect the movements of the avatar. The signals, received by the mobile communication device, would be converted to motion instructions by the game software, the game software would then apply the motion instructions to the one or more avatars and the one or more avatars would move as directed by the one or more motion instructions.

It is a further important innovation of the instant invention worth noting, that the one or more motions of the finger or other body parts do not necessarily constitute an equivalent motion of the player's avatar on the screen. For example, a triple somersault dive on a diving board may simply be a motion of three clockwise spins of the player's finger and then a point downward. This simple motion produced by the player could result in the avatar running over the diving board, jumping into the air, spinning three times and then diving into the pool. The motion produced by the player is not equivalent to the motions the avatar performs as a result of the command given by the player.

Also, the one or more motions made by the player may need to be different enough to be decipherable by the game software so that one motion instruction can be distinguished between another. For example, using the same diving motion, the player could have the same diving avatar jump up higher from the diving board by pointing up and then down to show a difference in the motion in contrast to the simple motion described previously.

And yet one motion instruction may be the same as another in the case of different contexts within the game or when the game software is in a different mode, for example in a training, tutorial or game option or setup mode as opposed to regular gameplay and may also be treated differently in a multiplayer mode. In addition, the same motion instruction may be useful in more than one game and may be treated either in the same manner or a different manner depending on how the game is programmed and how the player may have customized the game or the motion instruction.

For example, a player may raise their hand in a stopping motion and the game software may interpret this as a pause or to stop the game. Once the game is paused, it could be in a setup or option mode. The player could then rotate their right finger counterclockwise once to signify that they want the game software to roll back to the prior checkpoint in the game. However, the same motion, during the gameplay, could mean something completely different. In the case of the counterclockwise wind of the finger, it could be interpreted by the system that the diving avatar is commanded by the game software to flip counterclockwise in their dive. Because the game software knows that the state of the game system is in the gameplay mode, it handles the motion command differently than it would handle the same command while the system is in another mode such as option mode.

An example of this could be demonstrated by the avatar using a kick-jump-triple-spin move in one game by the player moving their finger in a spiral and then straight up and then down to initiate the move in one game, but only having to move the finger up and down in another game to do the same move, and the kick-jump-triple-spin move could mean something completely different in the second game than what it was interpreted as in the first game. Once the game software receives the one or more motion instructions, it can use the one or more motion instructions to perform a lookup in a database, for example, and compare each motion instruction with one or more motion instructions available in the system in the database. The database can have a setting which associates the one or more motion instructions with one or more games which have associated one or more motion instructions. If the game the player is playing and the motion instruction find a match, for example, the motion result, which is the actual action which may be applied to the one or more avatars, associated with the lookup is retrieved from the database and applied to the one or more avatars, and the resulting move or other activity appears on the screen or produces other anticipated results.

Figure 6:
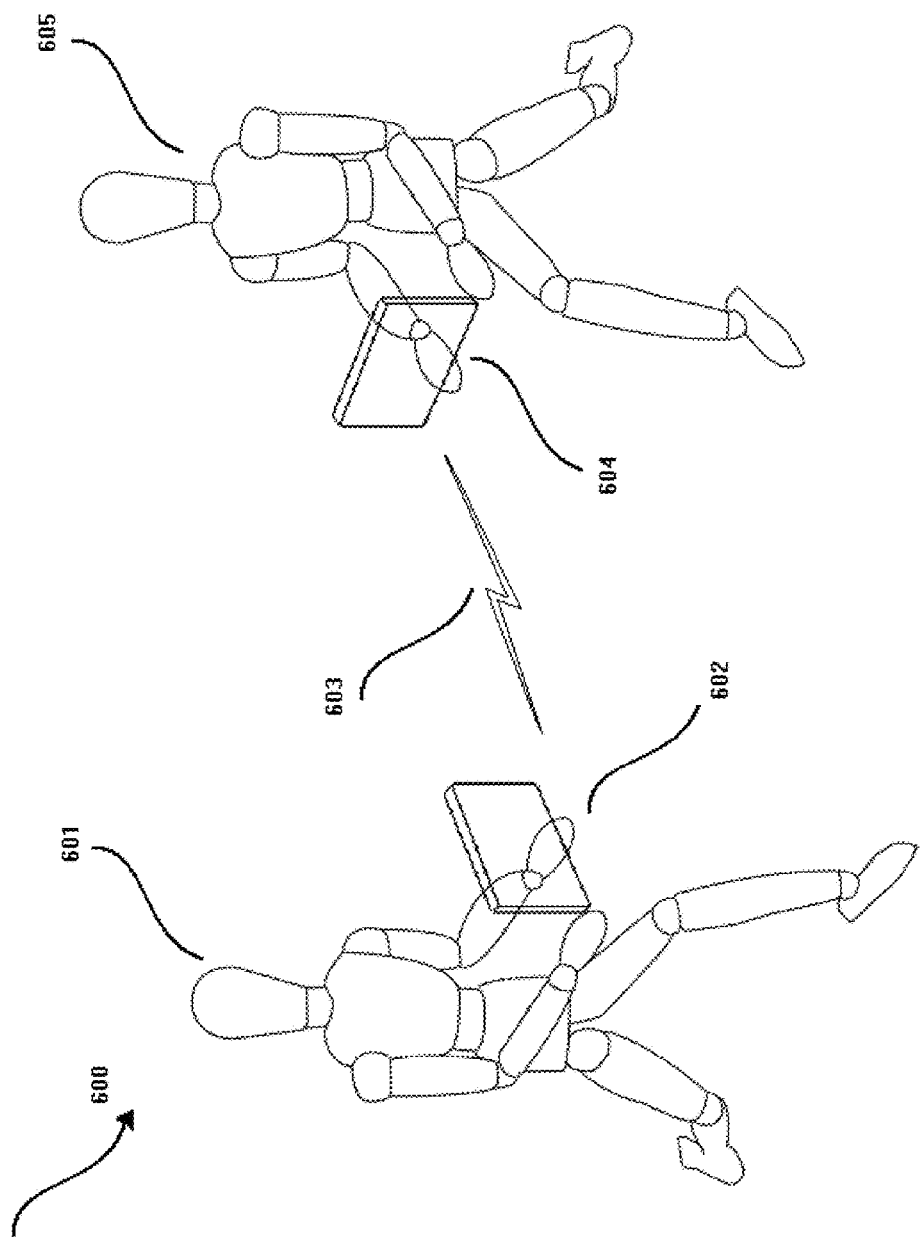
FIG. 6 is an example of more than one player participating in a motion instruction based gameplay using more than one mobile communication device.

Now referring to FIG. 6, a first player 601 (described in a system 600, shown in more detail in a system 800) may be holding or in front of a mobile communication device 602. While in front of the mobile communication device 602, the player 601 may change a facial feature, issue a voice command or move a body part (described in a system 600 of the instant invention, not fully shown) communicatively coupled to a device 604, further communicating with a device (i.e., console unit, personal computer, game unit, storage device, server, etc.) 604 via a tethered or wireless communication protocol 603. And a second or more users 605 holding, sitting, or standing in front of the mobile communication device 604 playing or observing the game being played.

The connected state where the mobile communication device 602 is communicatively coupled to a device 604, may transmit one or more motion instructions to the device 604 via a communication protocol 603 further being stored to the device 604.

In addition, the connected state where the mobile communication device 602 is communicatively coupled to a device 604, may receive one or more motion instructions from the device 604 via a communication protocol 603 further being stored to the mobile communication device 602.

Finally, the connected state where the mobile communication device 602 is communicatively coupled to a device 604, may both transmit and receive one or more motion instructions to/from the device 604 via a communication protocol 603 further being delivered and stored either to/from the mobile communication device 602 or to/from the mobile communication device 602 or both.

The first player 601 may transmit the one or more motion instructions from the mobile communication device 602 and received by one or more mobile communication devices 604 and viewed by the one or more second players 605 and the one or more second players 605 having the same ability, using their one or more mobile communication devices 604 to transmit one or more motion instructions to the receiving mobile communication device 602 and resulting motion viewed by the first player 601.

Figure 7:
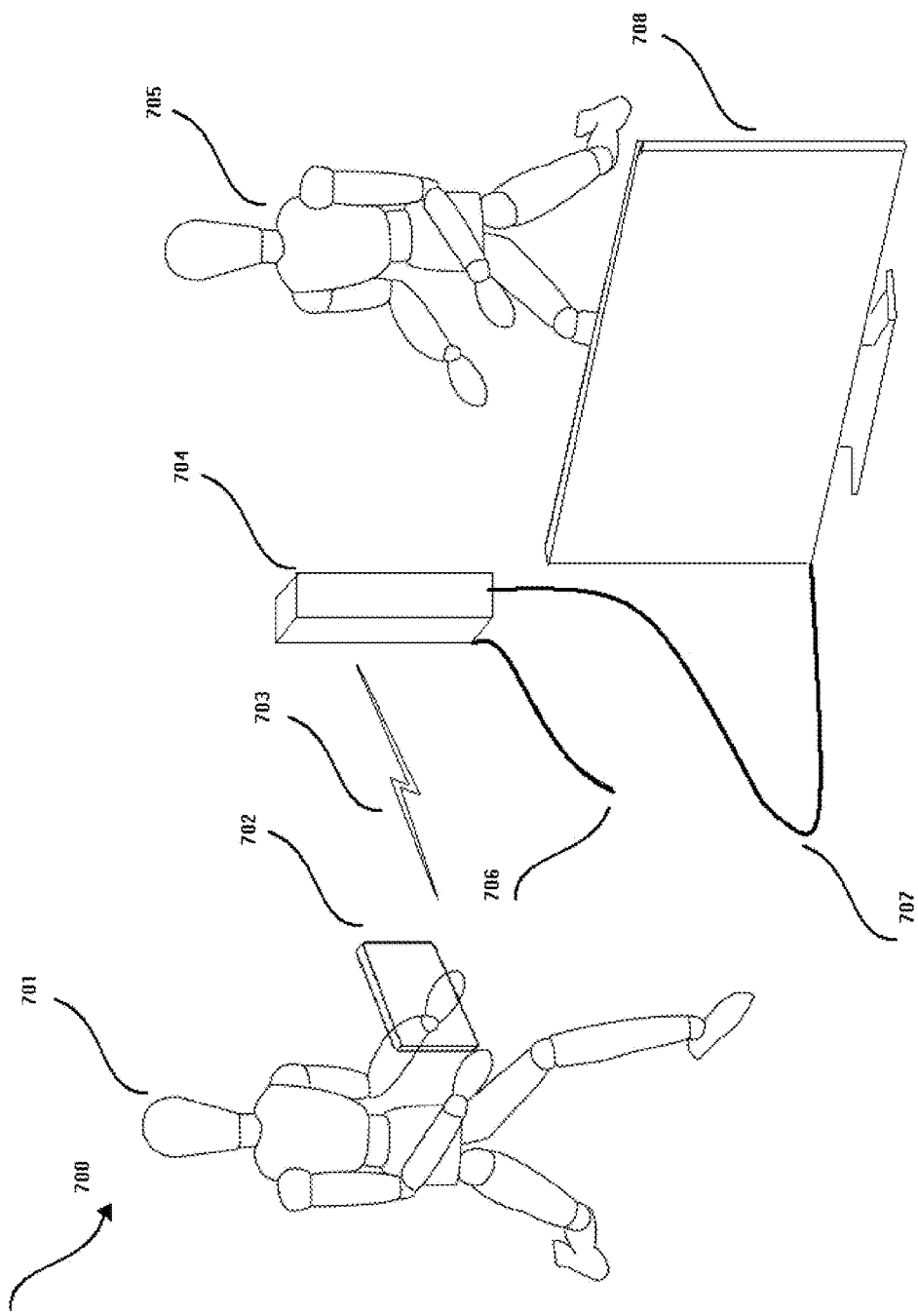
FIG. 7 is an example of more than one players participating in a motion instruction based gameplay using one or more mobile communication device and one or more console game units.

Now referring to FIG. 7, a first player 701 (described in a system 700, shown in more detail in a system 800) may be holding or standing/sitting, etc. in front of a mobile communication device 702. While in front of the mobile communication device 702, the player 701 may change a facial feature, issue a voice command or move a body part (described in a system 700 of the instant invention, not fully shown) communicatively coupled to a device 704, further communicating with a device (i.e., console unit, personal computer, game unit, storage device, server, etc.) 704 via a tethered or wireless communication protocol 703. And a second or more users 705 holding, sitting, or standing in front of the communication device 704 playing or observing the game being played.

In the manner of an example embodiment of the instant invention the communication device 704 may have a connection 706 connected to yet another device and may be connected to one or more screens 708 through another wired or wireless connection 707.

The connected state where the mobile communication device 702 is communicatively coupled to a device 704, may transmit one or more motion instructions to the device 704 via a communication protocol 703 further being stored to the device 704.

In addition, the connected state where the mobile communication device 702 is communicatively coupled to a device 704, may receive one or more motion instructions from the device 704 via a communication protocol 703 further being stored to the mobile communication device 702.

Finally, the connected state where the mobile communication device 702 is communicatively coupled to a device 704, may both transmit and receive one or more motion instructions to/from the device 704 via a communication protocol 703 further being delivered and stored either to/from the mobile communication device 702 or to/from the mobile communication device 702 or both.

The first player 701 may transmit the one or more motion instructions from the mobile communication device 702 and received by one or more communication devices 704 and viewed by the one or more second players 705 and the one or more second players 705 having the same ability, using their one or more communication devices 704 to transmit one or more motion instructions to the receiving mobile communication device 702 and resulting motion viewed by the first player 701.

Figure 8:
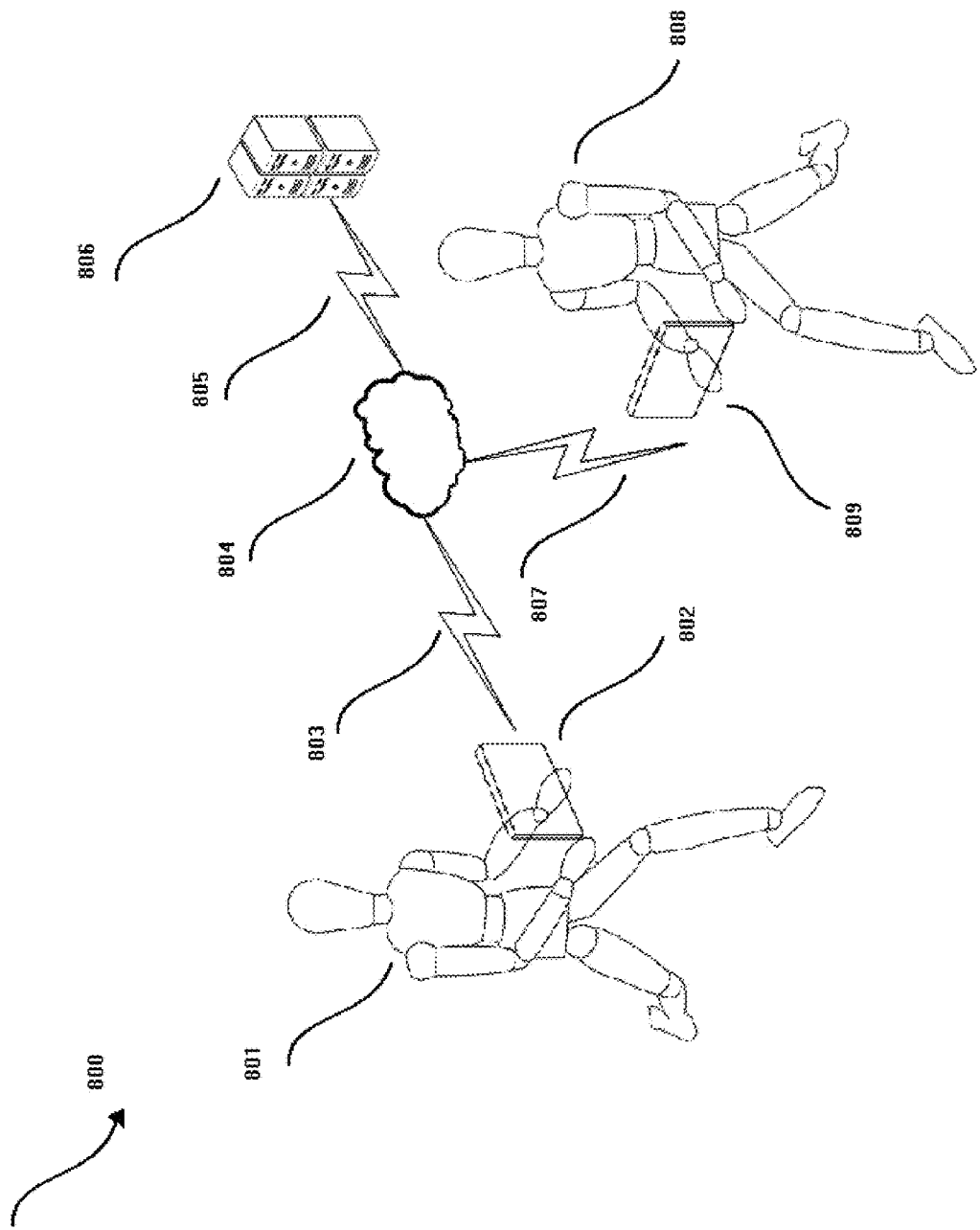
FIG. 8 is an example of more than one players participating in a motion instruction-based gameplay using one or more mobile communication devices and/or one or more console game units connected over a network which may be also connected to one or more servers.

Now referring to FIG. 8, a first player 801 (described in a system 800) may be holding or standing/sitting, etc. in front of a mobile communication device 802. While in front of the mobile communication device 802, the player 801 may change a facial feature, issue a voice command or move a body part (described in a system 800 of the instant invention) communicatively coupled to a device 806, further communicating with a device (i.e., console unit, personal computer, game unit, storage device, server, etc.) 806 via a tethered or wireless communication protocol 803, connected to a network 804 and further connected to the communication device 806 by a tethered or wireless connection 805. And a second or more users 808 holding, sitting, or standing in front of the communication device 809 playing or observing the game being played or receiving one or more motion instructions stored on the one or more communication devices 806 communicatively coupled to the device 806 or communicatively coupled to the device 802 through the said network connections, which may including none or more of the connections 803, 805 and/or 807.

In the manner of an example embodiment of the instant invention the communication device 809 may have a connection 807 connected to yet another device 806 through a connection 805 which may have the ability to provide downloadable one or more motion instructions available from the one or more servers 806. In addition, the one or more motion instructions may be uploaded to the one or more servers 806 from the player 808 or 801 through their single or collective devices 802 and 809, communicatively coupled through connections 803 and/or 807 and 805 to the one or more servers 806.

The connected state where the mobile communication device 802 may be further communicatively coupled to a device 806 and/or 809, may transmit one or more motion instructions to the device 806 and/or 809 via a communication protocol through the connections 803, and/or 805, and/or 807 further optionally being stored to the device 806 and/or 809.

In addition, the connected state where the mobile communication device 802 is communicatively coupled to a device 806 and/or 809, may receive one or more motion instructions from the device 806 and/or 809 via a communication protocol through the connections 803, and/or 805, and/or 807 further being stored to the mobile communication device 802.

Finally, the connected state where the mobile communication device 802 is communicatively coupled to a device 806 and/or 809, may all transmit and receive one or more motion instructions to/from the one or more servers 806 and/or mobile communication device 809 via a communication protocol through connections 803, and/or 805, and/or 807 further being delivered and/or stored either to/from the communication device 802 or to/from the mobile communication device 806 and/or 809 or both.

The first player 801 may transmit the one or more motion instructions from the mobile communication device 802 being received by one or more communication devices 806 and/or 809 and viewed by the one or more second players 808 and the one or more second players 808 having the same ability, using their one or more communication devices 809 to transmit one or more motion instructions to the receiving mobile communication device 802 or 806 and resulting motion viewed by the first player 801.

Figure 9:
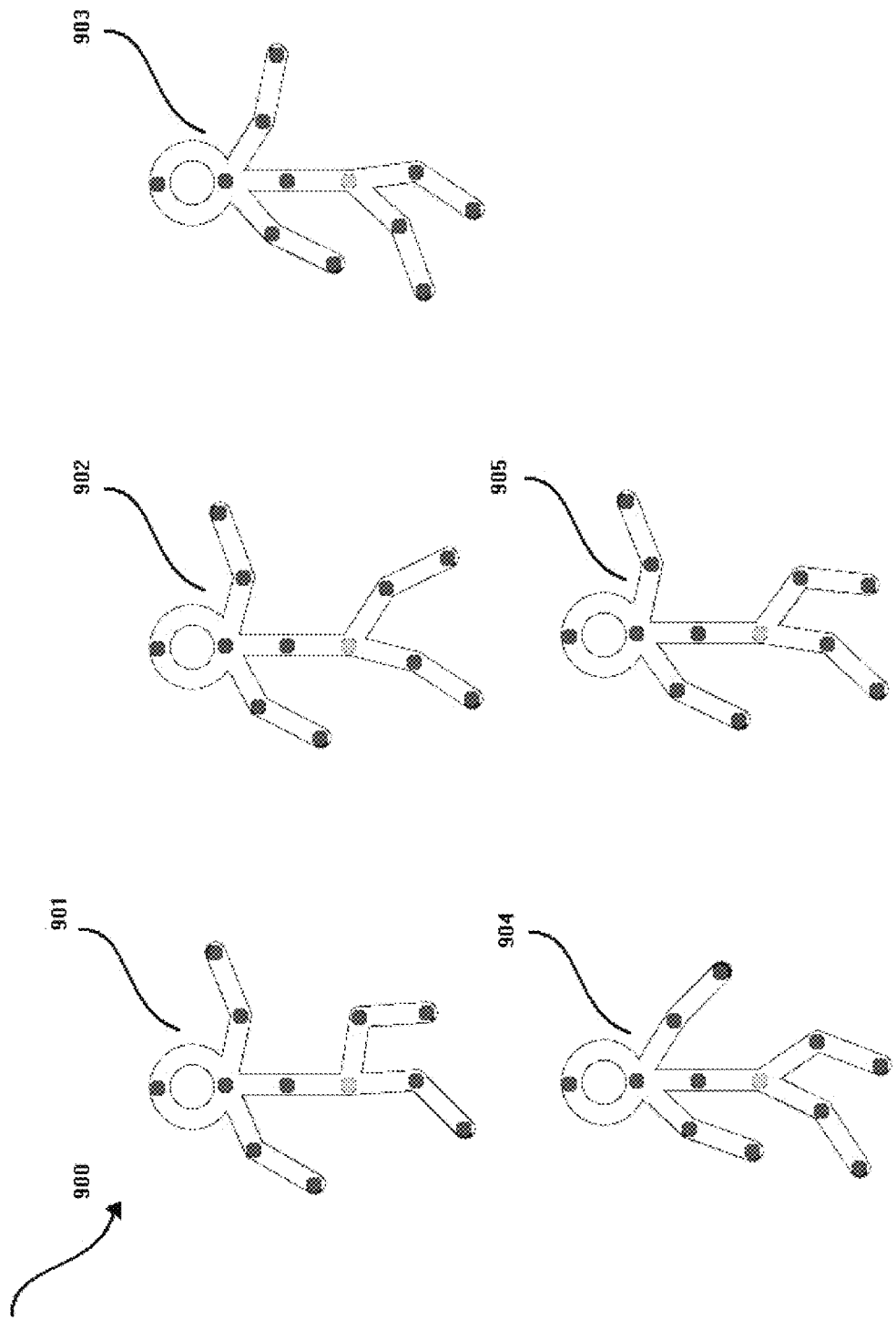
FIG. 9 shows an example of a motion instruction as it may be received by the present invention.
Figure 11:
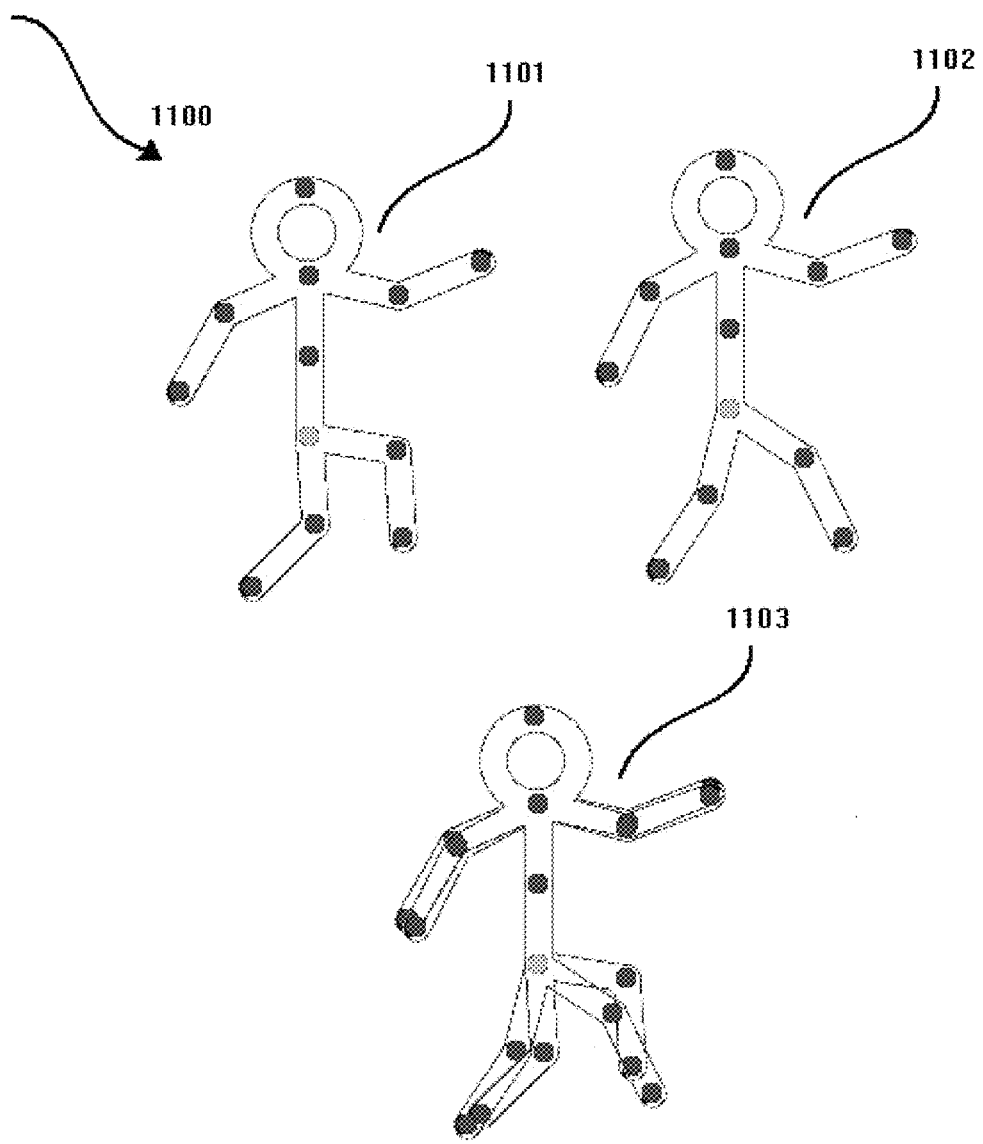
FIG. 11 represents an overlay structure of the first images from 901 and 902 in FIG. 9.

Now, referring to FIG. 9, where a motion is being received by a communication device, for example, running while dribbling a ball, separate frames may be captured into the system while the motion is occurring. System 900 describes an example embodiment of five frames each as 901, 902, 903, 904, and 905. Each of the described frames is collected for a motion instruction. The frames may be captured in various time intervals (seconds, microseconds, milliseconds, etc.) and some identical frames may be captured repeatedly as motions are repeated or other motions may be so slow that multiple frames are captured, whereas they can be dropped and/or later interpolated by the game software which has the ability to derive differences in relative motion points along particular axes (further described in FIG. 11, FIG. 12 and FIG. 13 by a partial reference to a system of the instant invention 1100, 1200 and 1300, respectively).

In addition, the number of points could range from one to thousands. The higher number of points captured results in a more detailed subject translation. For example, the twelve points captured in 901 cannot describe changes in facial features or hand details. Multiple mathematical references and coordinate groups may be needed to describe more intricate motions thereby producing more intricate motion vectors. For example, a mathematical model may be used to generate the motion points of the hand while another mathematical model is used to generate the motion points of the body and still another for the face (further described in FIG. 13 by a partial reference to a system of the instant invention 1300).

Figure 13:
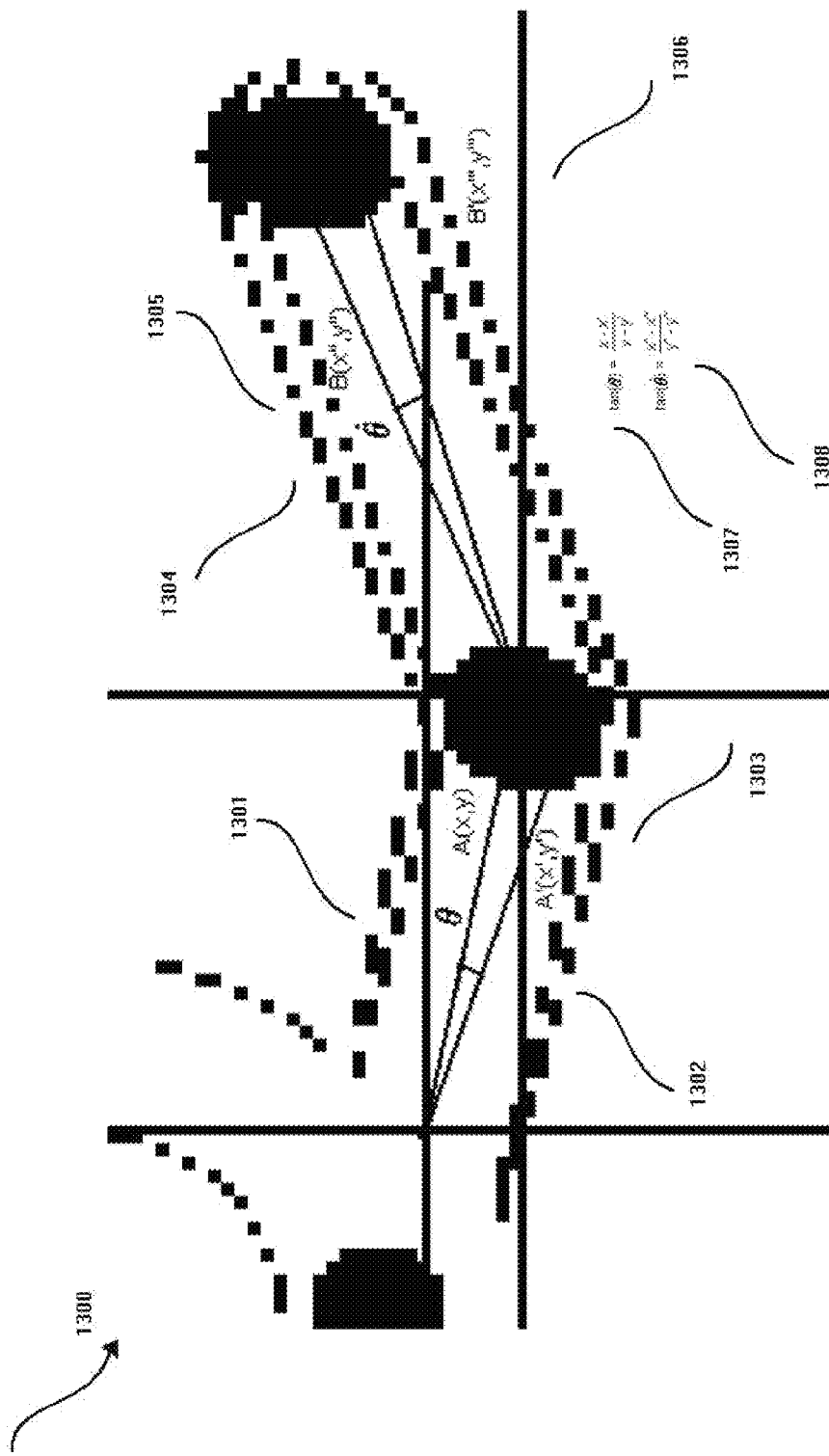
FIG. 13 shows the motion calculation details for the forearm and wrist of the avatar from the overlay image in FIG. 12.

Furthermore, each of these motion points could exist on their own coordinate system, having various levels of precision unrelated to each other (further described in FIG. 13 by a partial reference to a system of the instant invention 1300).

What the image in 901 does describe in this example is the body with arms and legs raised and/or moving in one or more directions. Adding in 902, the arms are in the same place, but the legs have moved. Based on the distance (point A and B) that the legs have moved in relation to each other, it can be discerned that the person is running. In 903 the arms and legs have moved. The arm has been lowered relative to the frame shown in 902. Still, in 904, the person has lowered their arm and still running Finally, in 905, the person is still running and raising their arm. In the context of a basketball game, the system can infer that the player is dribbling the basketball and is approaching a virtual basket. On the screen, the player can be moving the ball down the court at the same relative speed they are moving in the real world. The sequence of the described five frames would constitute the described motion and be registered in the system as such. Once the player repeats this motion in a gameplay scenario within the given game context, the avatar may appear to be dribbling a ball down the court. Therefore the relative distances between body parts point A versus point B, for example, may be used to describe the range of motion which can be used to determine the intended one or more motion instructions and apply these one or more motion instructions to the one or more associated movements or actions (further described in FIG. 13 by a partial reference to a system of the instant invention 1300).

Other items of interest include the direction the player is running within a confined area relative to the unconfined space of a computer program. If a player, for example, must turn in their room, the system must determine that they are only turning in the same room but are still progressing in the same direction in the game. If, for example, they impede on a virtual boundary within the computer system and the person switches direction, the avatar on the screen can be inferred as changing direction, also.

Figure 10:
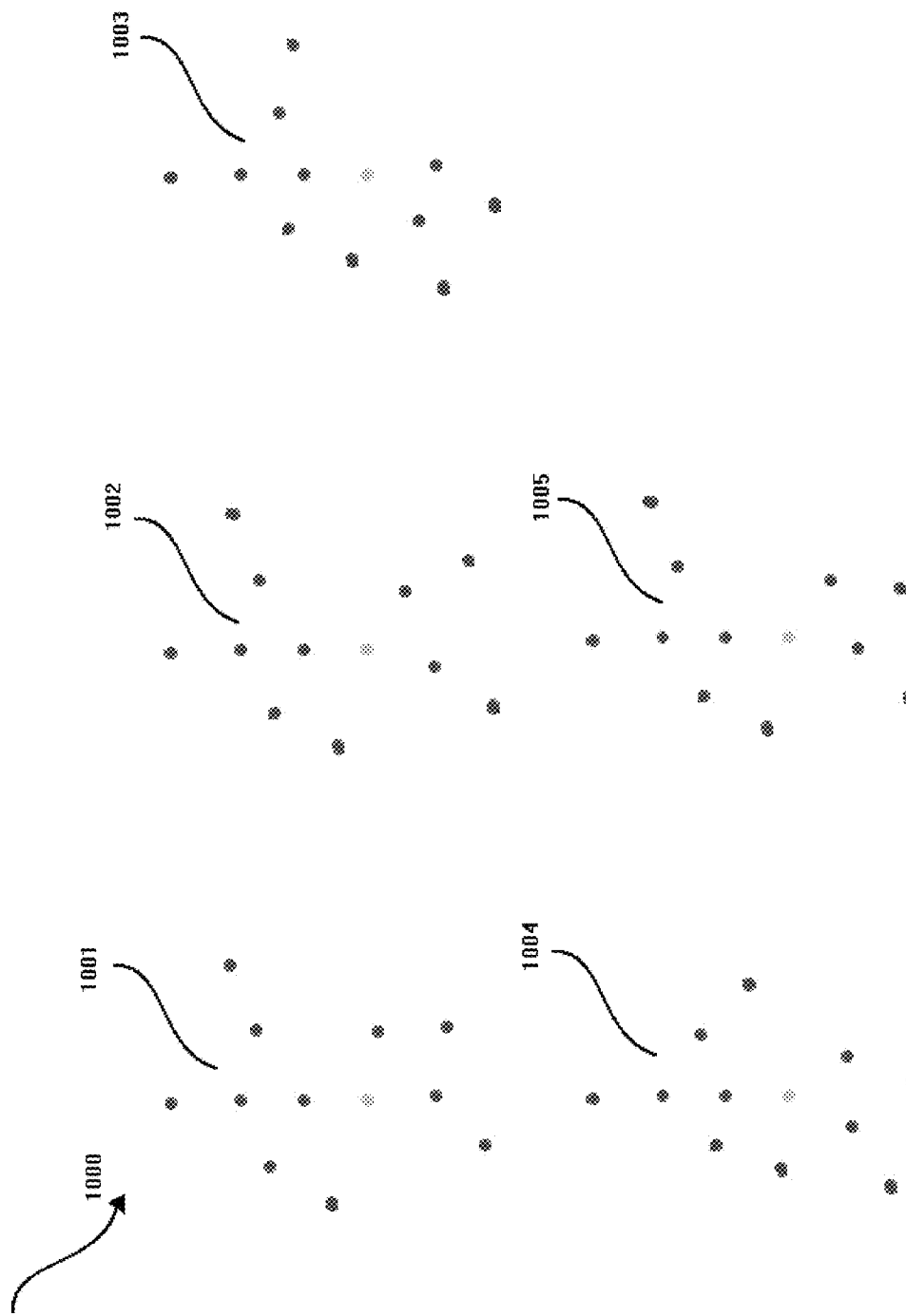
FIG. 10 shows an example of the motion instruction coordinates stored as they are related to the motion instructions received as shown in FIG. 9.

Referring now to FIG. 10, a system 1000 of the instant invention not fully shown appears as several points taken from the captured objects from system 900. Frames 1001, 1002, 1003, 1004, and 1005 represent the motion points captured from the described motion. Later, these points, or close approximations, may be captured in a during normal gameplay and compared to all of the groups of points previously captured in a pervious mode until a match is found so that the system may infer from the motion the motion which should be attributed to the avatar at that moment.

If a match is not found a configurable set of options may be performed. This can include the motion simply matched to a similar action within the context of the motion, the motion result defaulting to a present motion result, the player being prompted for the action they would like to take, or the motion simply processed as it is performed by the player.

In addition to the ability that the player can run and act like they are dribbling a ball, the system can be programmed to have the avatar run, dribbling the ball without actually requiring the player to be running. In this way, the speed of the avatar's run could be based on the speed of the dribble, for example.

In the same manner, a player without the ability to run, for example, could virtually run as they are directing their own, custom, avatar through other methods, such as moving just their hands or fingers. The motion of the hands or fingers could be related to the full body movement of an avatar on the screen. The way this might be performed would be based on the system learning the motions of the players' hands which they relate to certain movements made by the avatar. In another words, the player's hand could jump up into the air. In this way, if the system has recorded a hand jumping up into the air and it is related to the avatar jumping up into the air, the avatar would appear to jump up into the air on the screen based on the player's motions. The player's motions would be translated to motion frames, vector signatures, edge points, and then compared to the edge points stored in the game console's database. In this case, for example, a match would be found where the edge points for the avatar jumping up into the air would match, somewhat, the edge points produced when the player's hand moves up into the air. The match results in the avatar jumping up in the air on the screen and this is what the system uses to play out the player's motions.[0110] Referring now to FIG. 11, several collection of points of captured objects 1100 of the instant invention not fully shown appears as several collections of points from the captured objects from system 900, being frames 901 shown as frame 1101 and 902 shown as frame 1102, and the overlay of the frames 1101 and 1102 as frame overlay 1103. The overlay frames 1103 show the changes in motion for the legs and arms of the captured images 1101 and 1102. Using the overlay frames 1103, for example, the game software has the ability to determine the changes, direction and angle of motion of each forearm, arm, wrist, thigh, leg, etc. by measuring the changes in motion about several independent coordinate systems (shown further in FIG. 12 and FIG. 13).

Figure 12:
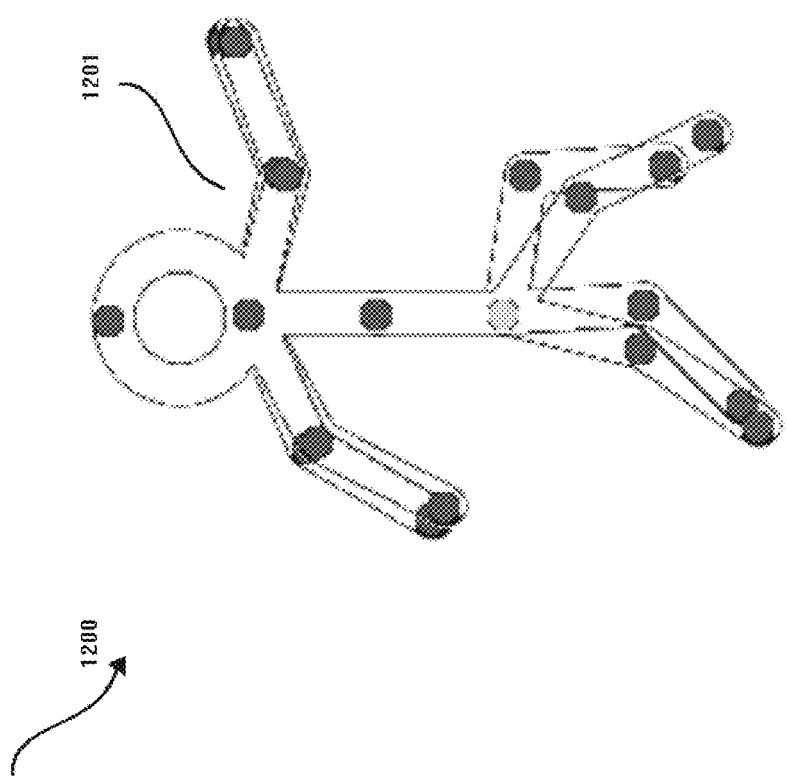
FIG. 12 represents a closer look at the figures forming the overlay image from FIG. 11.

Referring now to FIG. 12, several collection of points of captured objects 1200 of the instant invention not fully shown resembles the overlay figure of several collection of points of captured objects 1100 of the instant invention. In this example, the left arm of the FIG. 1201 is further shown in FIG. 13.

Referring now to FIG. 13, an overlay FIG. 1300 of the instant invention not fully shown resembles the overlay figure of several collections of points of captured objects 1100 and 1200 of the instant invention having an independent coordinate system A and another independent coordinate system B which is used to calculate the angle of rotation of the upper arm 1302 and the forearm 1306 as a part of the first arm 1303 and this rotation relative to the upper arm 1301 and the forearm 1304. Points A(x,y), being the center point along the x-axis of the coordinate system A, and A'(x',y'), being the center point along the x-axis of the coordinate system A are found about the angle of theta θ in the coordinate system A. Points B(x",y"), being the center point along the x-axis of the coordinate system B, and B'(x'",y'"), being the center point along the x-axis of the coordinate system B are found about the angle of theta θ' in the coordinate system B. The tangent of θ is taken as the difference of x and x' divided by the difference of y and y'. The tangent of θ' is taken as the difference of x" and x'" divided by the difference of y" and y'".

Therefore, based on the example of the slight upward motion of the player's arm described in 1300, the angle θ constitutes the motion of the upper arm within the independent coordinate system A while the angle θ' constitutes the motion of the lower arm within the independent coordinate system B. The angles θ and θ' and the vectors A and B could be used to form a motion instruction by the game software which could relate these angles, within a range, to a numerical value which may be used to search for a match in the database located in the mobile communication device.

Therefore the summation of the given motion angles θ and 0' and the vectors A and B could be stored in the database of the mobile communication device in the form of a matrix which constitutes a motion instruction. In this manner, as motions are read into the game system, the received motion may be converted into a motion instruction query which is used to search against the known list of motion instructions, resulting in a possible match, thereby resulting in an equivalent one or more responses by the game software to the resulting motion instruction.

This self same process could be used with the same or varying numbers of points, body parts, motions, etc., including the feet, head, facial features, eyes, torso, legs, etc. as well as the motions of other objects such as a ball, skateboard, drawings on a whiteboard, and any numerous other objects.

Along the same thought process, a collection of a given number of points attributed to one or more motions could also be related in a close proximity mode where only the hands are used to explicitly form the one or more motion instructions, being the equivalent of the full-body one or more motion instructions. The intent would be to make the gameplay more private while still maintaining the ability to control the mobile communication device without the use of a control pad. In this manner, the gameplay may be done while sitting with the device as opposed to standing in front of the device and producing full-body motions.

Also note that the motion described in the aforementioned example only calculates motions related to two-dimensional motion, but the game software is capable of processing motions using three-dimensional capture equipment and has the ability to distinguish motions in the x, y and z vectors along multiple independent axes.

Figure 14:
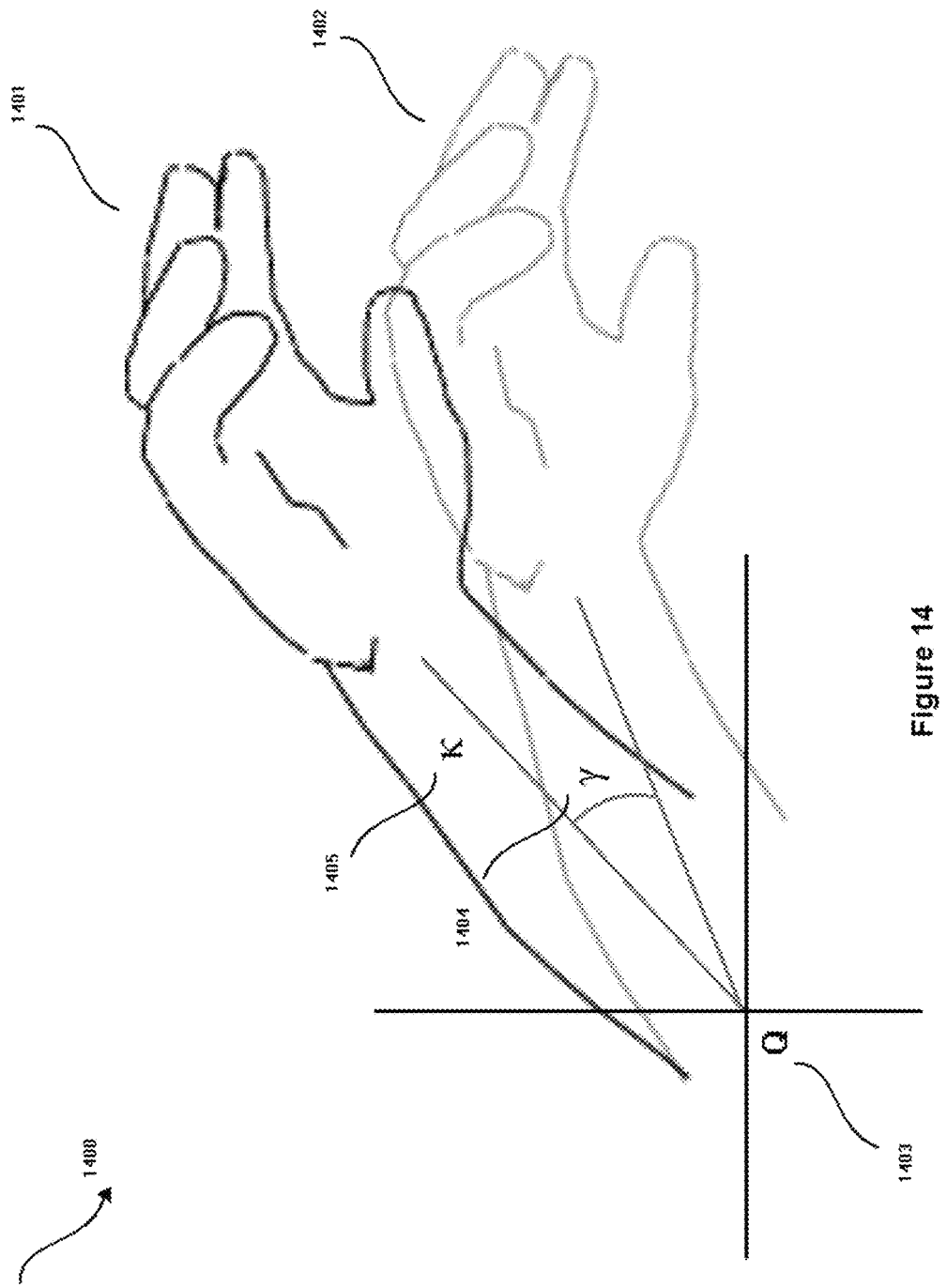
FIG. 14 shows the mobile equivalent motion about given axes in variance to the full-body motion shown in FIG. 9.

Referring now to FIG. 14, a captured motion 1400 by the instant invention shows a hand moving in an upward motion along a new coordinate system Q 1403. The first hand 1402 in this example is moving in a counterclockwise direction to where the second hand 1401 is shown about the axis Q 1403 and has a vector segment κ 1405 and an angle γ 1404.

As shown in the captured motion 1400, this motion requires much less effort than a full-body motion. However, based on an equivalence index, described further in FIG. 15, this motion is directly equivalent to the motion instruction described in 900, 1000, 1100, 1200 and 1300 which results in the same motion result of the avatar dribbling a ball, given the same context of the game. This translation between a full-body motion and a close proximity motion is done by the instant invention by associating the two motion instructions with each other using an equivalence index. Given the association of the motion instructions through the equivalence index, the gameplay may be done using a full-body motion or the close proximity motion, having the same desired results.

In addition to the ability to play the game through the normal motion instruction (NMI), based on full-body motion, the system has the ability to interpret one or more associated close proximity motions (CMI), collectively called the motion instructions, and download and/or receive these same or other motion instructions to/from one or more other devices.

The motion instructions as well as other game data may be transferred from the first mobile communication device to another device or from another device, such as a console system or other mobile communication device, to the first mobile communication device using any number of possible transmission protocols and may be capable of the same using protocols specified in the future as the motion instructions and other data may be simple text or binary data streams.

As an example, communication protocols could include an infrared connection, Bluetooth, wireless download, internet connection, or memory card.

In the case of an infrared connection, the mobile communication device could be held up to a console, for example, and the console would transfer the intended information to the mobile communication device. Once the mobile communication device receives the information from the console through the infrared connection, the information can be placed into the database or other storage means in the mobile communication device so that the game can be continued.

In the case of a Bluetooth connection, the mobile communication device could be set to contact, for example, a console. The console could then transfer the intended information to the mobile communication device. Once the mobile communication device receives the information from the console through the Bluetooth connection, the information can be placed into the database or other storage means in the mobile communication device so that the game can be continued.

In the case of a wireless or internet connection, the mobile communication device could be set to contact, for example, a console. The console could then transfer the intended information to the mobile communication device. Once the mobile communication device receives the information from the console through the wireless or internet connection, the information can be placed into the database or other storage means in the mobile communication device so that the game can be continued.

Through the available transmission protocols, for example the internet or wireless connection, the instant invention may also have the ability to allow the player to find and download motion instructions and/or other data from a remote or local server, other machine, console with an internet or wireless connection, or other mobile communication device. Likewise, the player could upload one or more motion instructions to the stated devices for the purpose of storing and/or sharing or selling the one or more motions instructions.

In the case of a memory card or game cartridge, for example, the player could connect the card to a first device, such as a console, mobile communication device, or other device, load the motion instructions and/or other data onto the card, remove the card and connect it to the mobile communication device or second device and the motion information and/or other data would be downloaded to the second device. The player could also receive the card through a purchase, sharing from a friend, as well as other possible means. Once the mobile communication device or second device receives the information from the card, the information can be placed into the database or other storage means in the mobile communication device so that the game can be continued or the game may be played using the card so that no database is involved.

Other methods may be used to transfer the motion instructions and/or other data to the mobile communication device for the purpose of playing a game. It is possible using the instant invention to transfer the motion instructions and/or other data using one protocol and then downloading the same information using another protocol. For example, a motion instruction may be transferred to a server using an internet connection and may be downloaded to a mobile communication device using a wireless connection.[0129]

Figure 15:
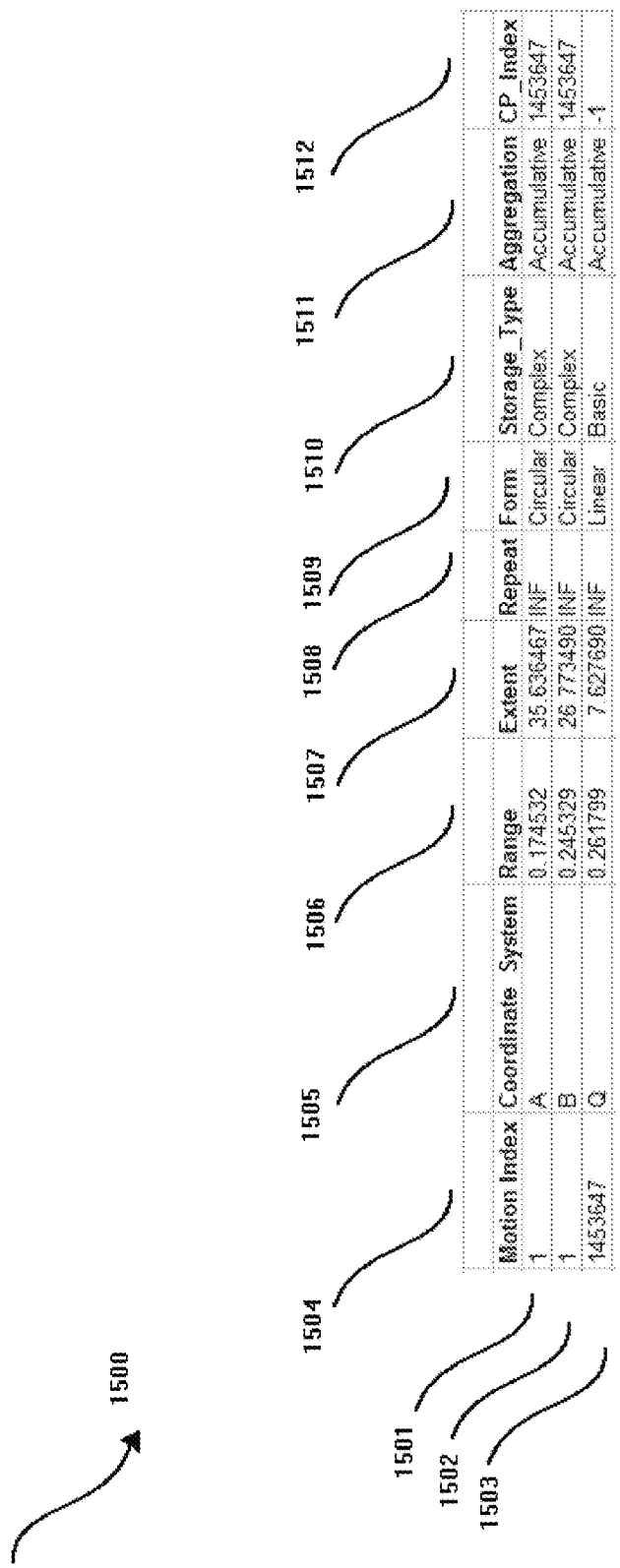
FIG. 15 shows an example full-body and mobile equivalent motion instruction storage array.

Referring now to FIG. 15, an example database vector object record 1500 of the instant invention showing rows and columns. The full set of rows and columns constitute a series of multiple vector sequences which describe a portion of a single motion instruction.

In the given example, the motion instruction shown in FIG. 13 may be stored in the gameplay system in the first and second rows of the vector object record as the normal motion instruction (NMI).

The motion index 1504 for the NMI is 1 and contains the coordinate systems A 1505 on the first row 1501 and coordinate system B 1505 on the second row 1502. The range 1506 of the upper arm is shown on coordinate system A 1505 along the first row 1501 in radians which describes the range of motion of the motion instruction for the NMI, coordinate system A 1505. This range 1506 is equivalent to the angle θ shown in FIG. 13. The associated extent 1507 on the first row 1501 is in centimeters in this example and provides the length of the vector A in the coordinate system A 1505 along the first row of the table 1501.

The second portion of the NMI, based on the coordinate system B 1505 on the second row 1502 has a motion index of 1 1504 because the coordinate system B 1505 is within the same NMI as the coordinate system A 1505 having the same motion index 1 1504. The range 1506 of the lower arm is shown on coordinate system B 1505 along the second row 1502 in radians which describes the range of motion of the motion instruction for the NMI, coordinate system B 1505. This range 1506 is equivalent to the angle θ' shown in FIG. 13. The associated extent 1507 on the second row 1502 is in centimeters in this example and provides the length of the vector B in the coordinate system B 1505 along the second row of the table 1502.

Other important aspects of the NMI may include the repeat cycle 1508, the motion form 1509, the storage type 1510, the aggregation 1511, the close proximity index 1512, among potentially others.

The repeat cycle 1508 may be based on the number of times a motion must be repeated before it equates to the motion instruction requirements. If the repeat cycle 1508 is set to INF, for example, the game software could know that the motion is simply matched and there is no requirement to check the number of repeated motions. If, however, the number of repeat cycles 1508 is set to a number, the game software could know that the motion instruction query does not match the intended motion instruction unless the motion is repeated, at least, until the number of motions match the required repeat cycle 1508.

The motion form 1509 may be used to designate the motion type. In the example shown, the motion form 1509 includes both linear and circular motion types. A linear type of motion is equivalent to a straight motion such as a vertical or horizontal motion. A circular motion is equivalent to rotated or spherical path of motion. Other motion types could be available.

The storage type 1510 may be used to assign the type of storage array used to hold the motion instruction. In the example NMI 1500 the complex storage type can be equivalent to a matrix. The matrix can include more than one independent motion and/or motion coordinate system which makes up one motion instruction. A basic storage type can describe a single row which may define a motion instruction. For example, in the motion table 1500, the third row 1503 shows the full independent motion for the close proximity motion instruction, CMI. Because the CMI is a simple linear motion, it can be described in one row 1503 as a single vector segment.

The aggregation column 1511 may be used so that the sum of the motion vectors, such as those in rows 1501 and 1502, make up the motion instruction NMI. Other aggregation types may be available.

The close proximity index 1512 may provide the ability for a NMI motion instruction to have a connection to a CMI motion instruction. In this manner, both motions can be understood by the game software to have an equivalence to a given motion result. So, the motion the player performs may be either a full-body motion which fits the NMI or a close proximity motion which fits the CMI, producing the same motion result. In the given example, this would show the avatar dribbling a ball.

The items described in FIG. 15 are a simple example of a portion of a normal motion instruction (NMI) having an extended close proximity motion instruction (CMI). However, motion instructions are not required to have close proximity motion instructions directly tied to them and close proximity motion instructions may stand alone where they are not tied to a normal motion instruction.

The values shown in FIG. 15 may be generated using any of many potential methods including through a manufacturer, a player, a gaming system, programmed system, or another entity knowledgeable in the art using a motion receiving and/or motion association session using the said device, a user interface, an editor, or other means.

One of the methods can include the player making one or more motions, the said device receiving the motions, converting the motions to one or more motion instructions and/or other data and the said device storing the motion instructions and/or other data to a database or other storage means in the said device.

At any point in time, the player, the game developer, the game system or other entity may assign the one or more motion instructions and/or other data to an intended action by the game software and/or game system. For example, the player could assign a given motion of moving their hand up and down as shown in FIG. 14 to an action of the avatar dribbling a ball. Once the assignment is made, it can be associated to the given motion instruction using, for example, the motion index 1501 by the player or other entity through a voice command, answering a prompt or other method either locally, remotely, manually or programmatically.

Once the said device receives the one or more motions, the game software may convert the one or more motions into one or more motion instructions which may include the assignment of one or more motion indices 1504, coordinate systems 1505, vector ranges 1506, vector extents 1507, repeat cycles 1508, motion forms 1509, storage types 1510, aggregation models 1511, among other items and may include close proximity indices 1512. Other data, not shown, may be provided and/or defined by a player or other entity.

Advanced players or other entities may even have the ability to create motion instruction data and/or action assignments manually using an editor or other means and load them into the said device.

In one embodiment of the instant invent, a mobile communications device comprising: a transceiver; an optical device; a system for playing a game; and a system for receiving motion instructions so that the game may be played without the physical use of a controller or pad exists; and a system which also has the ability to send and/or receive one or more motion instructions to/from a second device; wherein the mobile communications device has the ability to interact with the game software and affect the game settings and/or avatar movement; wherein a first mobile communications device has the ability to interact with the game software on a second device and affect the game settings and/or avatar movement on the second device; wherein the mobile communications device has the ability to send and/or receive game information to/from another device; wherein the mobile communications device has the ability to read and/or store game information to/from another device; the mobile communications device has the ability to send and/or receive motion instructions to/from another device; wherein the mobile communications device has the ability to read and/or store motion instructions to/from another device; wherein the mobile communications device has the ability to send and/or receive voice or other audio commands to/from another device; wherein the mobile communications device has the ability to read and/or store voice commands to/from another device; wherein a motion described is produced using the at least one of: one or more fingers; the face; the lips; one or more of the eyes; or other body parts; or non-body parts such as a wand or stylus.

It should be understood that the foregoing description is only illustrative of the instant invention. Various alternatives and modifications can be devised by those skilled in the art without departing from the claims of the instant invention including, but not limited to, the use of 2-dimensional motion instructions as well as 3-dimensional motion instructions and motion instructions with additional data combined or intermingled with it. Accordingly, the present invention is intended to embrace all such alternatives, modifications and variances which fall within the scope of the appended claims.

What is claimed:

1. A method of processing user movement via a mobile computing device, the method comprising:
   receiving at least one user movement via the mobile computing device;
   detecting a portion of a user's body via a plurality of points referencing the portion of the user's body;
   capturing a plurality of separate frames while a motion performed by the portion of the user's body is detected, wherein the separate frames comprise changes in the plurality of points as measured along predefined axes;
   identifying motion vectors corresponding to the changes in the plurality of points identified among the plurality of separate frames;
   measuring, via the mobile computing device, an arc of change based on a change between a first user position of the detected portion of the user's body and a second user position of the detected portion of the user's body resulting from changes in locations of the plurality of points of the detected portion of the user's body due to the at least one user movement as measured from the separate frames over a predetermined period of time, and wherein the changes in the locations of the plurality of points is further determined based on identifying an angle between a first position of a first point of the plurality of points of the portion of the user's body and a second position of the first point;

defining the arc of change based on the angle and the motion vector;

interpreting the arc of change as at least one motion instruction applied to a movement of a digital avatar of an active game session operating within a digital computing game;

creating packet data representing the at least one motion instruction;

comparing the motion instruction to a pre-stored known list of motion instructions;

determining at least the angle of the motion instruction matches an angle one of the pre-stored known motion instructions within a numerical range of certainty; and transmitting the packet data to a separate communication device to conduct the digital avatar movement of the active gaming session.

2. The method of claim 1, wherein the at least one user movement comprises at least one of a change in a user facial feature, a user voice command, and a moved user body part.

3. The method of claim 1, wherein the transmitting the packet data to the separate communication device comprises communicating over at least one of a tethered communication link and a wireless communication link.

4. The method of claim 1, wherein the at least one user movement comprises a series of movements which are interpreted as a game movement and applied to the active game session.

5. The method of claim 4, wherein the game movement is interpreted from the series of movements without the user providing button selections.

6. The method of claim 1, further comprising:
comparing the at least one motion instruction to at least one known result signal pre-stored in memory to determine a type of game movement to apply to the active game session.

7. An apparatus configured to process user movement, the apparatus comprising:
a receiver configured to receive at least one user movement;
a processor configured to
detect at least a portion of a user's body via a plurality of points referencing the portion of the user's body,
capture a plurality of separate frames while a motion performed by the portion of the user's body is detected, wherein the separate frames comprise changes in the plurality of points as measured along predefined axes,
identify motion vectors corresponding to the changes in the plurality of points identified among the plurality of separate frames,
measure an arc of change based on a change between a first user position of the detected portion of the user's body and a second user position of the detected portion of the user's body resulting from changes in locations of the plurality of points of the detected portion of the user's body due to the at least one user movement as measured from the separate frames over a predetermined period of time, and wherein the changes in the locations of the plurality of points is further determined based on identifying an angle between a first position of a first point of the plurality of points of the portion of the user's body and a second position of the first point,
interpret the arc of change as at least one motion instruction applied to a movement of a digital avatar of an active game session operating within a digital computing game, and
create packet data representing the at least one motion instruction;
compare the motion instruction to a pre-stored known list of motion instructions;
determine at least the angle of the motion instruction matches an angle one of the pre-stored known motion instructions within a numerical range of certainty; and
a transmitter configured to transmit the packet data to a separate communication device to conduct the digital avatar movement of the active gaming session.

8. The apparatus of claim 7, wherein the at least one user movement comprises at least one of a change in a user facial feature, a user voice command, and a moved user body part.

9. The apparatus of claim 7, wherein the packet data is transmitted to the separate communication device by communicating over at least one of a tethered communication link and a wireless communication link.

10. The apparatus of claim 7, wherein the at least one user movement comprises a series of movements which are interpreted as a game movement and which is applied to the active game session.

11. The apparatus of claim 10, wherein the game movement is interpreted from the series of movements without the user providing button selections.

12. The apparatus of claim 7, wherein the processor is further configured to compare the at least one motion instruction to at least one known result signal pre-stored in memory to determine a type of game movement to apply to the active game session.

13. A non-transitory computer readable storage medium configured to store instructions that when executed cause a processor to perform processing user movement via a mobile computing device, the processor being further configured to perform:
receiving at least one user movement via the mobile computing device;
detecting at least a portion of a user's body via a plurality of points referencing the portion of the user's body;
capturing a plurality of separate frames while a motion performed by the portion of the user's body is detected, wherein the separate frames comprise changes in the plurality of points as measured along predefined axes;
identifying motion vectors corresponding to the changes in the plurality of points identified among the plurality of separate frames;
measuring, via the mobile computing device, an arc of change based on a change between a first user position of the detected portion of the user's body and a second user position of the detected portion of the user's body resulting from changes in locations of the plurality of points of the detected portion of the user's body due to the at least one user movement as measured from the separate frames over a predetermined period of time, and wherein the changes in the locations of the plurality of points is further determined based on identifying an angle between a first position of a first point of the plurality of points of the portion of the user's body and a second position of the first point;

interpreting the arc of change as at least one motion instruction applied to a movement of a digital avatar of an active game session operating within a digital computing game;

creating packet data representing the at least one motion instruction;

comparing the motion instruction to a pre-stored known list of motion instructions;

determining at least the angle of the motion instruction matches an angle one of the pre-stored known motion instructions within a numerical range of certainty; and transmitting the packet data to a separate communication device to conduct the digital avatar movement of the active gaming session.

14. The non-transitory computer readable storage medium of claim 13, wherein the at least one user movement comprises at least one of a change in a user facial feature, a user voice command, and a moved user body part.

15. The non-transitory computer readable storage medium of claim 13, wherein the transmitting the packet data to the separate communication device comprises communicating over at least one of a tethered communication link and a wireless communication link.

16. The non-transitory computer readable storage medium of claim 13, wherein the at least one user movement comprises a series of movements which are interpreted as a game movement and applied to the active game session.

17. The non-transitory computer readable storage medium of claim 16, wherein the game movement is interpreted from the series of movements without the user providing button selections.

18. The non-transitory computer readable storage medium of claim 13 wherein the processor is further configured to perform:

comparing the at least one motion instruction to at least one known result signal pre-stored in memory to determine a type of game movement to apply to the active game session.

* * * * *